United States Patent
Kobayashi et al.

(10) Patent No.: US 12,338,337 B2
(45) Date of Patent: Jun. 24, 2025

(54) EXPANDABLE METHYL METHACRYLATE RESIN PARTICLES, METHYL METHACRYLATE RESIN PRE-EXPANDED PARTICLES, METHYL METHACRYLATE EXPANSION-MOLDED BODY, AND METHOD FOR PRODUCING EXPANDABLE METHYL METHACRYLATE RESIN PARTICLES

(71) Applicant: KANEKA CORPORATION, Osaka (JP)

(72) Inventors: Tsuyoshi Kobayashi, Hyogo (JP); Kirito Suzuki, Hyogo (JP); Taro Kiguchi, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 940 days.

(21) Appl. No.: 17/487,136

(22) Filed: Sep. 28, 2021

(65) Prior Publication Data

US 2022/0010090 A1   Jan. 13, 2022

Related U.S. Application Data

(63) Continuation of application No. PCT/JP2020/013276, filed on Mar. 25, 2020.

(30) Foreign Application Priority Data

Mar. 29, 2019  (JP) ................................ 2019-068365
Mar. 29, 2019  (JP) ................................ 2019-068367

(51) Int. Cl.
| | | |
|---|---|---|
| C08J 9/18 | (2006.01) | |
| B22C 7/02 | (2006.01) | |
| C08F 220/14 | (2006.01) | |
| C08J 9/14 | (2006.01) | |

(52) U.S. Cl.
CPC ................. *C08J 9/18* (2013.01); *B22C 7/023* (2013.01); *C08F 220/14* (2013.01); *C08J 9/141* (2013.01); *C08J 2333/08* (2013.01); *C08J 2333/12* (2013.01)

(58) Field of Classification Search
CPC . C08J 9/18; C08J 9/141; C08J 2333/08; C08J 2333/12; C08J 2201/034; C08J 2203/14; C08J 2205/044; C08J 9/232; B22C 7/023; B22C 7/02; C08F 220/14; C08F 220/1804; C08F 222/102
See application file for complete search history.

(56) References Cited

U.S. PATENT DOCUMENTS

| | | | |
|---|---|---|---|
| 2015/0274920 A1 | 10/2015 | Goto et al. | |
| 2017/0291216 A1* | 10/2017 | Suzuki | ........................ C08J 9/20 |
| 2018/0030233 A1 | 2/2018 | Kuwada et al. | |

FOREIGN PATENT DOCUMENTS

| | | | |
|---|---|---|---|
| JP | H11-269300 | A | 10/1999 |
| JP | 2000-86804 | A | 3/2000 |
| JP | 2000086804 | A * | 3/2000 |
| JP | 2001-233986 | A | 8/2001 |
| JP | 2003-261603 | A | 9/2003 |
| JP | 2005-307075 | A | 11/2005 |
| JP | 2006-241256 | A | 9/2006 |
| JP | 2012-207215 | A | 10/2012 |
| JP | 2015-013423 | A | 1/2015 |
| JP | 2015-183111 | A | 10/2015 |
| JP | 2018-135407 | A | 8/2018 |
| JP | 2018-135408 | A | 8/2018 |
| WO | 2016/047490 | A1 | 3/2016 |
| WO | 2016/140223 | A1 | 9/2016 |

OTHER PUBLICATIONS

International Preliminary Report on Patentability issued in corresponding International Patent Application No. PCT/JP2020/013276, mailed on Oct. 14, 2021 (7 pages).
International Search Report issued in corresponding International Patent Application No. PCT/JP2020/013276, mailed on Jun. 16, 2020 (2 pages).
Notice of Reasons for Refusal issued in corresponding Japanese Patent Application No. 2021-511857, dated Apr. 16, 2024 (6 pages).
Office Action issued in Chinese Application No. 202080024195.7; Dated Jul. 26, 2022 with translation (16 pages).
Extended European search report issued in corresponding European Application No. 20782701.5 dated Dec. 13, 2022 (5 pages).

* cited by examiner

*Primary Examiner* — K. Boyle
(74) *Attorney, Agent, or Firm* — Osha Bergman Watanabe & Burton LLP

(57) ABSTRACT

Expandable methyl methacrylate resin particles having a narrow particle size distribution, a good yield, and excellent expandability and formability are provided. The expandable methyl methacrylate resin particles include a base resin containing, as constitutional units, a certain amount of a methyl methacrylate unit and a certain amount of acrylic ester unit, and a blowing agent. The expandable methyl methacrylate resin particles have an average particle diameter of 0.6 mm to 1.0 mm and a particle diameter variation coefficient of not more than 20%.

3 Claims, No Drawings

EXPANDABLE METHYL METHACRYLATE RESIN PARTICLES, METHYL METHACRYLATE RESIN PRE-EXPANDED PARTICLES, METHYL METHACRYLATE EXPANSION-MOLDED BODY, AND METHOD FOR PRODUCING EXPANDABLE METHYL METHACRYLATE RESIN PARTICLES

TECHNICAL FIELD

One or more embodiments of the present invention relate to expandable methyl methacrylate resin particles, methyl methacrylate resin pre-expanded particles, methyl methacrylate expansion-molded body, and a method for producing expandable methyl methacrylate resin particles.

BACKGROUND

As a technique for carrying out metal casting, evaporative pattern casting technique (full mold technique) is known. The evaporative pattern casting technique is a technique for producing a casting by burying a pattern made of an expansion-molded body in casting sand and pouring a molten metal to the expansion-molded body so that the expansion-formed body is replaced with the metal. The full mold technique uses an expansion-molded body of a methyl methacrylate polymer from the viewpoint of reduction in a residue remaining after casting. As the expansion-molded body for casting, a piece cut off from a large block molded body is often used.

As expandable methyl methacrylate resin particles used to produce an expansion-molded body made of a methyl methacrylate polymer, Patent Literature 1 discloses, for example, an expandable acrylic resin produced with use of methacrylate ester, acrylic ester, and a polyfunctional monomer so as to achieve expandability and formability. Patent Literature 2 discloses expandable methyl methacrylate resin particles which are a polymer of methyl methacrylate, acrylic acid alkyl ester and styrene and with which a highly-rigid molded body can be obtained. Patent Literature 3 discloses a method for producing methacrylate ester resin particles with a high yield.

PATENT LITERATURE

[Patent Literature 1]
  WO 2016/047490
[Patent Literature 2]
  WO 2016/140223
[Patent Literature 3]
  Japanese Patent Application Publication, Tokukai, No. 2003-261603
[Patent Literature 4]
  Japanese Patent Application Publication Tokukai No. 2001-233986
[Patent Literature 5]
  Japanese Patent Application Publication Tokukai No. 2006-241256
[Patent Literature 6]
  Japanese Patent Application Publication Tokukai No. 2015-183111
[Patent Literature 7]
  Japanese Patent Application Publication Tokukai No. 2018-135407
[Patent Literature 8]
  Japanese Patent Application Publication Tokukai No. 1999-269300

However, the above-described conventional techniques have some room for improvements in terms of the yield, expandability, and/or formability.

SUMMARY

In consideration of these circumstances, one or more embodiments of the present invention provide expandable methyl methacrylate resin particles, methyl methacrylate resin pre-expanded particles, methyl methacrylate expansion-molded body each having a narrow particle size distribution, a good yield, and excellent expandability and formability, and a method for producing the expandable methyl methacrylate resin particles.

The inventors of one or more embodiments of the present invention conducted diligent studies. As a result, the inventors of one or more embodiments of the present invention completed one or more embodiments of the present invention.

Expandable methyl methacrylate resin particles in accordance with one or more embodiments of the present invention are expandable methyl methacrylate resin particles including: a base resin including, as constitutional units, a methyl methacrylate unit and an acrylic ester unit; and a blowing agent, a content of the methyl methacrylate unit being not less than 91 parts by weight and not more than 99 parts by weight and a content of the acrylic ester unit being not less than 1 part by weight and not more than 9 parts by weight, relative to 100 parts by weight of a total content of the methyl methacrylate unit and the acrylic ester unit in the base resin, the expandable methyl methacrylate resin particles having (a) an average particle diameter of 0.6 mm to 1.0 mm and (b) a particle diameter variation coefficient of not more than 20%.

A method in accordance with one or more embodiments of the present invention for producing expandable methyl methacrylate resin particles is a method for producing expandable methyl methacrylate resin particles, including the steps of: (a) copolymerizing monomers including a methyl methacrylate monomer and an acrylic ester monomer to obtain a copolymer; and (b) impregnating a blowing agent in the copolymer thus obtained, wherein in the step (a), an amount of the methyl methacrylate monomer to be added is not less than 91 parts by weight and not more than 99 parts by weight and an amount of the acrylic ester monomer to be added is not less than 1 part by weight and not more than 9 parts by weight, relative to 100 parts by weight of a total amount of the methyl methacrylate monomer and the acrylic ester monomer to be added, and in the step (a), the monomers are added to an aqueous medium to initiate a polymerization reaction of the monomers, the aqueous medium containing a poorly water-soluble inorganic salt in an amount of not less than 0.08 parts by weight and not more than 0.20 parts by weight relative to 100 parts by weight of the monomers, and at a timing when a polymerization conversion rate is not less than 35% and not more than 70%, a poorly water-soluble inorganic salt is added thereto in an amount of not less than 0.08 parts by weight and not more than 0.50 parts by weight relative to 100 parts by weight of the monomers, and the expandable methyl methacrylate resin particles have an average particle diameter of 0.6 mm to 1.0 mm.

One or more embodiments of the present invention bring about an effect of providing expandable methyl methacrylate resin particles having a narrow particle size distribution, a good yield, and excellent expandability and formability. Particularly, one or more embodiments of the present invention bring about an effect of providing expandable methyl methacrylate resin particles suitably applied to an evaporative pattern for use in metal casting.

DETAILED DESCRIPTION

The following will describe one or more embodiments of the present invention. However, one or more embodiments of the present invention are not limited to this. One or more embodiments of the present invention are not limited to the configurations described below, but can be altered within the scope of the claims. One or more embodiments of the present invention also encompass, in their technical scopes, any embodiments or examples derived by combining technical means disclosed in differing embodiments or examples. Furthermore, a new technical feature can be attained by combining technical means disclosed in the embodiments. Note that all the academic documents and patent literatures described herein are incorporated herein as reference literatures. Unless otherwise noted, the expression "A to B" indicating a numerical range means "not less than A (equal to or more than A) and not more than B (equal to or less than B)".

I. Embodiment 1

I-1. Technical Idea of Embodiment 1 of the Present Invention

As a result of diligent studies, the inventors of one or more embodiments of the present invention found that the techniques disclosed in Patent Literatures 1 to 3 have some room for improvements as explained below.

Expandable methyl methacrylate resin particles disclosed Patent Literatures 1 and 2 have a wide particle size distribution and include a large amount of small particles. Thus, the techniques disclosed in Patent Literatures 1 and 2 may cause loss in sieving and/or occurrence of blocking during pre-expansion, thereby resulting in insufficient yields. In terms of this, the techniques disclosed in Patent Literatures 1 and 2 have some room for improvements. Patent Literature 3 discloses a method capable of producing methyl methacrylate resin particles having a narrow particle size distribution. However, the methyl methacrylate resin particles produced by this production method has a small average particle diameter of 0.3 mm to 0.5 mm. Therefore, the production method of Patent Literature 3 has some room for improvements in terms of expandability and/or occurrence of blocking.

The inventors of one or more embodiments of the present invention (a) attained new finding that it is generally difficult to form a large methyl methacrylate polymer block and fusion inside the block molded body is difficult to occur when expandable methyl methacrylate resin particles having a too large or too small average particle diameter are used. In addition, the inventors of one or more embodiments of the present invention (b) uniquely focused on the phenomenon that, although expandable methyl methacrylate resin particles are typically sieved to collect particles only within a target particle diameter range and the particles thus collected are used, much loss occurs in sieving and the yield of expandable methyl methacrylate resin particles is reduced, in a case where the expandable methyl methacrylate resin particles have a wide particle size distribution. Based on the new finding and unique focus point, the inventors of one or more embodiments of the present invention conducted diligent studies, and consequently completed an invention in accordance with Embodiment 1 of the present invention.

I-2. Expandable Methyl Methacrylate Resin Particles

Expandable methyl methacrylate resin particles in accordance with Embodiment 1 of the present invention are expandable methyl methacrylate resin particles including: a base resin including, as constitutional units, a methyl methacrylate unit and an acrylic ester unit; and a blowing agent, a content of the methyl methacrylate unit being not less than 91 parts by weight and not more than 99 parts by weight and a content of the acrylic ester unit being not less than 1 part by weight and not more than 9 parts by weight, relative to 100 parts by weight of a total content of the methyl methacrylate unit and the acrylic ester unit in the base resin, the expandable methyl methacrylate resin particles having (a) an average particle diameter of 0.6 mm to 1.0 mm and (b) a particle diameter variation coefficient of not more than 20%.

The expandable methyl methacrylate resin particles in accordance with Embodiment 1 of the present invention have the above-described features, and therefore have advantages of a narrow particle size distribution, a good yield, and excellent expandability and formability.

The base resin included in the expandable methyl methacrylate resin particles in accordance with Embodiment 1 of the present invention includes, as the constitutional units, the methyl methacrylate unit and the acrylic ester unit. The "methyl methacrylate unit" herein refers to a constitutional unit derived from a methyl methacrylate monomer. The "acrylic ester unit" refers to a constitutional unit derived from an acrylic ester monomer.

The expression "monomer" may occasionally be omitted herein. Thus, for example, the simple expressions "methyl methacrylate" and "acrylic ester" herein respectively mean the "methyl methacrylate monomer" and "acrylic ester monomer".

Herein, "expandable methyl methacrylate resin particles" may sometimes be expressed as "expandable resin particles", the "methyl methacrylate resin pre-expanded particles" may sometimes be expressed as "pre-expanded particles", and the "methyl methacrylate expansion-molded body" may sometimes be expressed as an "expansion-molded body".

In the base resin included in the expandable methyl methacrylate resin particles in accordance with Embodiment 1 of the present invention, the proportions of the contents of the methyl methacrylate unit and the acrylic ester unit may be (a) not less than 92 parts by weight and not more than 97 parts by weight of the methyl methacrylate and not less than 3 parts by weight and not more than 8 parts by weight of the acrylic ester, (b) not less than 93 parts by weight and not more than 96 parts by weight of the methyl methacrylate and not less than 4 parts by weight and not more than 7 parts by weight of the acrylic ester, (c) not less than 94 parts by weight and not more than 96 parts by weight of the methyl methacrylate and not less than 4 parts by weight and not more than 6 parts by weight of the acrylic ester, or (d) not less than 94.5 parts by weight and not more than 95.0 parts by weight of the methyl methacrylate and not less than 5.0 parts by weight and not more than 5.5 parts by weight of the acrylic ester, relative to 100 parts by weight of the total content of the methyl methacrylate unit and the acrylic ester unit. With a base resin containing the methyl methacrylate unit in a content exceeding 99 parts by weight, resulting expandable resin particles tend to have poor expandability and formability. With use of such expandable resin particles, it is difficult to obtain an expansion-molded body having a beautiful surface. With a base resin containing the acrylic ester unit in a content exceeding 9 parts by weight, a resulting expansion-molded body tends to shrink.

Examples of the acrylic ester in accordance with Embodiment 1 of the present invention encompass methyl acrylate, ethyl acrylate, propyl acrylate, and butyl acrylate. The acrylic ester may be butyl acrylate, since use of butyl acrylate provides a great effect of reducing a glass-transition temperature of the base resin.

In other words, the acrylic ester unit may be a butyl acrylate unit derived from butyl acrylate. With this configuration, it is possible to obtain expandable resin particles having more excellent expandability and formability.

The base resin included in the expandable methyl methacrylate resin particles in accordance with Embodiment 1 of the present invention may further include, as a constitutional unit, a bifunctional monomer unit, in order to reduce a residue remaining after burning and to adjust the molecular weight. The "bifunctional monomer unit" herein refers to a constitutional unit derived from a bifunctional monomer. Examples of the bifunctional monomer encompass (a) compounds prepared by esterifying, with acrylic acids or methacrylic acids, hydroxyl groups at both terminals of ethylene glycol such as ethylene glycol di(meth)acrylate, diethylene glycol di(meth)acrylate, or triethylene glycol di(meth)acrylate or of an oligomer of the ethylene glycol, (b) compounds prepared by esterifying, with an acrylic acid or a methacrylic acid, a hydroxyl group of dihydric alcohol such as neopentyl glycol di(meth)acrylate, hexanediol di(meth)acrylate, or butanediol di(meth)acrylate, and (c) an aryl compound having two alkenyl groups such as divinylbenzene. The bifunctional monomer may be hexanediol di(meth)acrylate such as 1,6-hexanediol diacrylate, since it is easy to adjust the molecular weight of a base resin including it.

The content of the bifunctional monomer unit in the base resin may be not less than 0.05 parts by weight and not more than 0.15 parts by weight, or not less than 0.08 parts by weight and not more than 0.13 parts by weight, with respect to 100 parts by weight of the total content of the methyl methacrylate unit and the acrylic ester unit. Setting the content of the bifunctional monomer unit within the above range can yield expandable resin particles having excellent expandability and formability. By using the expandable resin particles, it is possible to obtain an expansion-molded body with which a residue hardly remains after casting (burning) and which has excellent rigidity.

In accordance with Embodiment 1 of the present invention, an aromatic vinyl compound may be contained as a copolymerization component.

In other words, in Embodiment 1 of the present invention, the base resin may further include, as a constitutional unit, a constitutional unit derived from an aromatic vinyl compound.

Examples of the aromatic vinyl compound encompass styrene, α-methylstyrene, paramethylstyrene, t-butylstyrene, and chlorostyrene. Use of the aromatic vinyl compound enhances the rigidity of the expansion-molded body. However, in consideration of soot generation in casting, the amount of the aromatic vinyl compound to be used may be as small as possible. The amount of the aromatic vinyl compound to be used may be not more than 2 parts by weight relative to 100 parts by weight of the base resin. The aromatic vinyl compound may be not used.

In other words, the content of the constitutional unit derived from the aromatic vinyl compound may be not more than 2 parts by weight, or 0 parts by weight, relative to 100 parts by weight of the base resin. That is to say, preferably, the base resin does not contain the constitutional unit derived from the aromatic vinyl compound.

The expandable methyl methacrylate resin particles in accordance with Embodiment 1 of the present invention may have a weight average molecular weight in terms of polystyrene measured by gel permeation chromatography (GPC) of not less than 300,000 and not more than 400,000. With use of the expandable resin particles in which the weight average molecular weight is set so as to fall within the above range, it is possible to obtain an expansion-molded body with which a residue hardly remains after casting (burning) and which has excellent surface property.

I-3. Method for Producing Expandable Methyl Methacrylate Resin Particles

A method in accordance with Embodiment 1 of the present invention for producing expandable methyl methacrylate resin particles is a method for producing expandable methyl methacrylate resin particles, comprising the steps of: (a) copolymerizing monomers including a methyl methacrylate monomer and an acrylic ester monomer to obtain a copolymer; and (b) impregnating a blowing agent in the copolymer thus obtained, wherein in the step (a), an amount of the methyl methacrylate monomer to be added is not less than 91 parts by weight and not more than 99 parts by weight and an amount of the acrylic ester monomer to be added is not less than 1 part by weight and not more than 9 parts by weight, relative to 100 parts by weight of a total amount of the methyl methacrylate monomer and the acrylic ester monomer to be added, and in the step (a), the monomers are added to an aqueous medium to initiate a polymerization reaction of the monomers, the aqueous medium containing a poorly water-soluble inorganic salt in an amount of not less than 0.08 parts by weight and not more than 0.20 parts by weight relative to 100 parts by weight of the monomers, and at a timing when a polymerization conversion rate is not less than 35% and not more than 70%, a poorly water-soluble inorganic salt is added thereto in an amount of not less than 0.08 parts by weight and not more than 0.50 parts by weight relative to 100 parts by weight of the monomers, and the expandable methyl methacrylate resin particles have an average particle diameter of 0.6 mm to 1.0 mm.

The "poorly water-soluble inorganic salt" herein refers to an inorganic salt having a solubility of not more than 0.1 mg/ml in water of 25° C.

The method in accordance with Embodiment 1 of the present invention for producing expandable methyl methacrylate resin particles have the above-described features, and therefore can provide the above-described expandable methyl methacrylate resin particles, advantageously. That is, the method in accordance with Embodiment 1 of the present invention for producing the expandable methyl methacrylate resin particles is suitably applicable to produce the above-described expandable methyl methacrylate resin particles. Note that the "copolymer" in the method in accordance with Embodiment 1 of the present invention for producing expandable methyl methacrylate resin particles corresponds to the "base resin" contained in the above-described expandable methyl methacrylate resin particles.

The method in accordance with Embodiment 1 of the present invention has the above-described features, and therefore can provide expandable methyl methacrylate resin particles having a narrow particle size distribution, a good yield, and excellent expandability and formability, advantageously.

The following will describe the method in accordance with Embodiment 1 of the present invention for producing expandable methyl methacrylate resin particles. Except for matters described in detail below, the description in [I-2. Expandable methyl methacrylate resin particles] is cited as appropriate.

The copolymerization step in the method in accordance with Embodiment 1 of the present invention for producing expandable methyl methacrylate resin particles may be suspension polymerization according to which polymerization is carried out in an aqueous suspension.

The "aqueous suspension" herein refers to a liquid prepared by dispersing, with a stirrer and/or the like, resin particles and/or monomer droplets in water or an aqueous solution. In the aqueous suspension, a water-soluble surfactant and the monomers may be dissolved. Alternatively, in the aqueous suspension, a dispersion agent, a polymerization initiator, a chain transfer agent, a crosslinking agent, a cell adjusting agent, a flame retardant, a solvent, a plasticizer, and or the like, each of which is water-insoluble, may be dispersed together with the monomers.

In the copolymerization step in accordance with Embodiment 1 of the present invention, the aqueous medium to which the monomer is to be added contains, as a dispersion agent, a poorly water-soluble inorganic salt in an amount of not less than 0.08 parts by weight and not more than 0.20 parts by weight, relative to 100 parts by weight of the monomers to be added. In the copolymerization step in accordance with Embodiment 1 of the present invention, the aqueous medium to which the monomers are to be added may further contains a dispersion agent which is not the poorly water-soluble inorganic salt, a polymerization initiator, a chain transfer agent, a crosslinking agent, a cell adjusting agent, a flame retardant, a solvent, a plasticizer, and/or the like. In the copolymerization step in accordance with Embodiment 1 of the present invention, the dispersion agent which is not the poorly water-soluble inorganic salt, polymerization initiator, chain transfer agent, crosslinking agent, cell adjusting agent, flame retardant, solvent, plasticizer, and/or the like, may be added together with the monomers to the aqueous medium containing a given amount of the poorly water-soluble inorganic salt, so as to initiate a polymerization reaction of the monomers.

The weight ratio between the resin (the methyl methacrylate resin, which may be rephrased as the copolymer) and the water or aqueous solution in the aqueous suspension may be 1.0/0.6 to 1.0/3.0, in terms of the ratio of the resulting methyl methacrylate resin with respect to the water or aqueous solution. Note that the "aqueous solution" herein means a solution made of water and a component that is not the methyl methacrylate resin.

Hereinafter, the copolymer (base resin) obtained in the copolymerization step may be simply referred to as "resin particles", occasionally.

In the copolymerization step in accordance with Embodiment 1 of the present invention, the monomers are added to the aqueous suspension (corresponding to the aqueous medium) containing the poorly water-soluble inorganic salt as the dispersion agent, so as to initiate a polymerization reaction of the monomers. A dispersion agent that can be used (added) at a timing before the polymerization reaction is initiated (hereinafter, such a timing may also be referred to as an "initial stage of polymerization") may be, for example, a poorly water-soluble inorganic salt such as tricalcium phosphate, magnesium pyrophosphate, hydroxyapatite, or kaolin. In addition, a water-soluble polymer such as polyvinyl alcohol, methylcellulose, polyacrylamide, or polyvinyl pyrrolidone and/or an anionic surfactant such as α-olefinsulfonic acid soda or dodecylbenzenesulfonic acid soda may be used in combination with the poorly water-soluble inorganic salt.

The poorly water-soluble inorganic salt to be used at the initial stage of the polymerization may be tricalcium phosphate, from the viewpoint of the protection of the resin particles and/or the monomer droplets. The aqueous suspension at the initial stage of the polymerization may contain tricalcium phosphate that is a poorly water-soluble inorganic salt and α-olefinsulfonic acid soda that is an anionic surfactant, from the viewpoint of the dispersion stability of the droplets.

The amount of the poorly water-soluble inorganic salt to be used at the initial stage of the polymerization is not less than 0.08 parts by weight and not more than 0.20 parts by weight, preferably not less than 0.10 parts by weight and not more than 0.19 parts by weight, more preferably not less than 0.12 parts by weight and not more than 0.18 parts by weight, even more preferably not less than 0.14 parts by weight and not more than 0.16 parts by weight, relative to 100 parts by weight of the monomers. Setting the amount of the poorly water-soluble inorganic salt to be used at the initial stage of the polymerization so as to be (a) less than 0.08 parts by weight relative to 100 parts by weight of the monomers yields expandable methyl methacrylate resin particles having a too large average particle diameter. Meanwhile, setting the amount of the poorly water-soluble inorganic salt to be used at the initial stage of the polymerization so as to (b) exceed 0.20 parts by weight relative to 100 parts by weight of the monomers yields expandable methyl methacrylate resin particles having a too small average particle diameter. In a case where the anionic surfactant and/or the water-soluble polymer is used in combination with the poorly water-soluble inorganic salt, the concentration of the anionic surfactant and/or the water-soluble polymer in the water may be not less than 30 ppm and not more than 100 ppm.

In the copolymerization step in accordance with Embodiment 1 of the present invention, at a timing when the polymerization conversion rate is not less than 35% and not more than 70%, the poorly water-soluble inorganic salt is added to the aqueous suspension (in other words, a reaction solution) in an amount of not less than 0.08 parts by weight and not more than 0.50 parts by weight relative to 100 parts by weight of the monomer. Note that, hereinafter, a timing after the polymerization is initiated may occasionally be referred to as "during polymerization", in contrast to the expression "before polymerization" ("before a polymerization reaction is initiated"). The poorly water-soluble inorganic salt to be used during the polymerization may be one or more kinds selected from the group consisting of tricalcium phosphate, hydroxyapatite, and kaolin, and is more preferably tricalcium phosphate. With this feature, it is possible to prevent coalescence of the resin particles at the time of and after addition of the dispersion agent, thereby making it possible to yield resin particles having a target particle diameter. That is, in the copolymerization step in accordance with Embodiment 1 of the present invention, it is preferable to use tricalcium phosphate as the dispersion agent to be used at a timing when the polymerization conversion rate is not less than 35% and not more than 70% during the polymerization.

The amount of the poorly water-soluble inorganic salt to be added to the aqueous suspension at the timing when the polymerization conversion rate is not more than 0.35 parts by weight and not more than 70% during the polymerization is not less than 0.08 parts by weight and not more than 0.50 parts by weight, more preferably not less than 0.10 parts by weight and not more than 0.50 parts by weight, even more preferably not less than 0.10 parts by weight and not more than 0.45 parts by weight, further more preferably not less than 0.10 parts by weight and not more than 0.40 parts by weight, still more preferably not less than 0.10 parts by weight and not more than 0.35 parts by weight, yet more preferably not less than 0.10 parts by weight and not more than 0.30 parts by weight, relative to 100 parts by weight of the monomers. Setting the amount of the poorly water-soluble inorganic salt to be added at the timing when the polymerization conversion rate is not less than 35% and not more than 70% during the polymerization so as to be (a) less than 0.08 parts by weight relative to 100 parts by weight of the monomers yields expandable resin particles having a too large average particle diameter. Meanwhile, setting the amount of the poorly water-soluble inorganic salt to be added at this timing so as to (b) exceed 0.50 parts by weight results in high production cost, since the used amount of the poorly water-soluble inorganic salt is excess.

The timing to add the poorly water-soluble inorganic salt to the aqueous suspension during the polymerization is a timing when the polymerization conversion rate is 35% to 70%, preferably 35% to 60%, more preferably 40% to 50%. Adding the poorly water-soluble inorganic salt to the aqueous suspension during the polymerization and at a timing when the polymerization conversion rate is less than 35% yields expandable resin particles having a too small average particle diameter. Meanwhile, adding the poorly water-soluble inorganic salt to the aqueous suspension when the polymerization conversion rate is greater than 70% yields expandable resin particles having a too large average particle diameter.

In the copolymerization step in accordance with Embodiment 1 of the present invention, it is preferable to carry out polymerization of a first stage at 70° C. to 90° C. with use of a low temperature decomposition type initiator so that a major polymerization reaction takes place and then to carry out a polymerization reaction of a second stage at a temperature (90° C. to 110° C.) higher than that of the first stage with use of a high temperature decomposition type initiator so that a residual monomer is reduced.

As the polymerization initiator, a radical generating polymerization initiator generally used to produce a thermoplastic polymer is used. Examples of the typical radical generating polymerization initiator encompass (a) organic peroxides such as benzoyl peroxide, lauroyl peroxide, t-butyl peroxidebenzoate, isopropyl-t-butyl peroxycarbonate, butyl perbenzoate, t-butyl peroxy-2-ethylhexanoate, t-butyl perpivalate, t-butyl peroxy isopropyl carbonate, di-t-butyl peroxy hexahydro terephthalate, 1,1-di(t-butyl peroxy) 3,3,5-trimethylcyclohexane, 1,1-bis(t-amylperoxy)-3,3,5-trimethylcyclohexane, 1,1-bis(t-butyl peroxy)cyclohexane, t-butyl peroxy-2-ethylhexyl monocarbonate and (b) azo compounds such as azobis isobutyronitrile and azobis dimethylvaleronitrile. One kind of these polymerization initiators may be used alone, or two or more kinds may be used in combination. The amount of the polymerization initiator to be used may be set so that the sum of the amount of the polymerization initiator used in the polymerization of the first stage and the amount of the polymerization initiator used in the polymerization of the second stage is not less than 0.1 parts by weight and not more than 0.5 parts by weight relative to 100 parts by weight of the monomers, for example. Setting the used amount of the polymerization initiator within the above range can yield expandable methyl methacrylate resin particles having excellent expandability.

The high temperature decomposition type initiator to be used (to act) in the polymerization of the second stage may be added to the aqueous medium (aqueous suspension) before the polymerization reaction is initiated, together with the low temperature decomposition type initiator to be used (to act) in the polymerization of the first stage.

In the copolymerization step in accordance with Embodiment 1 of the present invention, it is preferable to use, as the chain transfer agent, a known chain transfer agent usable for polymerization of the methyl methacrylate resin. Examples of the chain transfer agent encompass (a) monofunctional chain transfer agents such as alkylmercaptans and thioglycolates and (b) polyfunctional chain transfer agents prepared by esterifying, with thioglycollic acid or 3-mercaptoptopionic acid, hydroxyl groups of polyhydric alcohols such as ethylene glycol, neopentyl glycol, trimethylolpropane, and sorbitol. The amount of the chain transfer agent to be used may be not less than 0.1 parts by weight and less than 0.5 parts by weight, relative to 100 parts by weight of the base resin, for example.

Examples of the blowing agent to be used in the blowing agent impregnation step in accordance with Embodiment 1 of the present invention encompass (a) aliphatic hydrocarbons that are $C_{3-5}$ hydrocarbons such as propane, isobutane, normal butane, isopentane, normal pentane, and neopentane and (b) volatile blowing agents such as hydrofluorocarbons having zero ozone depletion potential, e.g., difluoroethane and tetrafluoro ethane. Two or more kinds of these blowing agents may be used in combination, without any matters. The amount of the blowing agent to be used may be not less than 5 parts by weight and not more than 12 parts by weight, or not less than 7 parts by weight and not more than 10 parts by weight, relative to 100 parts by weight of the expandable methyl methacrylate resin particles. Setting the used amount of the blowing agent so as to fall within the above range can yield expandable resin particles with which pre-expanded particles having a high expansion ratio can be obtained, thereby avoiding agglomeration of the resin particles in the blowing agent impregnation step, advantageously.

The blowing agent may be impregnated in the resin particles at a timing when the polymerization conversion rate of the resin particles is not less than 80% and not more than 95%. In a case where the polymerization conversion rate at the time of impregnation of the blowing agent is within the above range, agglomeration of the resin particles hardly occurs in the blowing agent impregnation step, the expandable resin particles can be obtained at a high yield, and an expansion-molded body obtained with use of pre-expanded particles produced by expanding the expandable resin particles achieves favorable surface smoothness.

In other words, the blowing agent impregnation step may be carried out or initiated at a timing when the polymerization conversion rate is not less than 80% and not more than 95%.

The impregnation temperature at the time of impregnating the blowing agent in the resin particles (i.e., at the time of the blowing agent impregnation step) may be not less than 95° C. and not more than 120° C., or not less than 100° C. and not more than 117° C. In a case where the impregnation temperature is within the above range, impregnation equipment, which is heavy equipment, is not necessary to produce the expandable resin particles, and an expansion-molded body obtained with use of pre-expanded particles produced by expanding the expandable resin particles achieves favorable surface smoothness.

The solvent may be a solvent having a boiling point of not lower than 50° C., examples of which encompass (a) $C_6$ or more (6 or more carbon atoms) aliphatic hydrocarbon such as toluene, hexane, and heptane and (b) $C_6$ or more alicyclic hydrocarbon such as cyclohexane and cyclooctane. The solvent having a boiling point of not lower than 50° C. may be toluene and/or cyclohexane, in order to obtain expandable resin particles having excellent expandability. The amount of the solvent to be used may be not less than 1.5 parts by weight and not more than 3.0 parts by weight, relative to 100 parts by weight of the monomer. By setting the used amount of the solvent so as to fall within the above range, it is possible to obtain expandable resin particles having excellent expandability. In addition, with use of pre-expanded particles produced by expanding the expandable resin particles, it is possible to obtain an expansion-molded body having high dimensional stability. Preferably, the solvent component having a boiling point of not lower than 50° C. is added into the aqueous suspension immediately before the blowing agent is impregnated in the resin particles or at the same time when the blowing agent is added.

The plasticizer may be a high boiling point plasticizer having a boiling point of not lower than 200° C., examples of which encompass (a) fatty acid glyceride such as stearic acid triglyceride, palmitic acid triglyceride, lauric acid triglyceride, stearic acid diglyceride, and stearic acid monoglyceride, (b) vegetable oil such as coconut oil, palm oil, and palm kernel oil, (c) fatty acid ester such as dioctyl adipate and dibutyl sebacate, and (d) organic hydrocarbon such as liquid paraffin and cyclohexane.

Examples of the cell adjusting agent encompass (a) aliphatic bisamide such as methylene-bis-stearic acid amide and ethylene-bis-stearic acid amide and (b) polyethylene wax.

The expandable methyl methacrylate resin particles in accordance with Embodiment 1 of the present invention have an average particle diameter of 0.6 mm to 1.0 mm, more preferably 0.7 mm to 0.9 mm. With an average particle diameter of less than 0.6 mm, expandability in pre-expansion is impaired and/or blocking is increased. With an average particle diameter exceeding 1.0 mm, the expansion power of the pre-expanded particles becomes too high. Consequently, during molding involving use of the pre-expanded particles, the surface of a molded body is formed instantly and accordingly vapor does not reach the inside of the molded product, which causes poor fusion inside the molded body.

In Embodiment 1 of the present invention, the average particle diameter of the expandable methyl methacrylate resin particles means an average particle diameter in terms of volume. The average particle diameter can be rephrased as a volume-average particle diameter. The method for measuring the average particle diameter and the like will be described in detail in Examples.

The coefficient of variation of the particle size of the expandable methyl methacrylate resin particles in accordance with Embodiment 1 of the present invention is not more than 20%. As the coefficient of variation becomes lower, the loss occurred in sieving is reduced, and thus the expandable methyl methacrylate resin particles can be obtained at a higher yield. In a case where the expandable methyl methacrylate resin particles in accordance with Embodiment 1 of the present invention have a high coefficient of variation, the expandable methyl methacrylate resin particles include a large amount of small particles (having a small average particle diameter). The small particles may cause blocking.

The expandable methyl methacrylate resin particles thus obtained can be transformed into pre-expanded particles (herein, also referred to as "expanded particles" or "methyl methacrylate pre-expanded particles") by a general pre-expansion method. Specifically, the expandable resin particles are put into a container provided with a stirrer. Then, the expandable resin particles are heated by a heat source such as water vapor, so that the expandable resin particles are pre-expanded to attain a desired volume magnification. Consequently, it is possible to attain pre-expanded particles.

In addition, the methyl methacrylate pre-expanded particles can be molded into an expansion-molded body by a general in-mold molding method. Specifically, the methyl methacrylate pre-expanded particles are charged in a mold that can be closed but cannot be sealed. Then, the methyl methacrylate pre-expanded particles are heated by water vapor so as to be fused to each other. Consequently, an expansion-molded body is obtained.

The expansion-molded body obtained by molding pre-expanded particles (also referred to as expanded particles) prepared by pre-expanding the expandable methyl methacrylate resin particles in accordance with Embodiment 1 of the present invention may have a rate of fusion of not less than 60%. The expansion-molded body having a rate of fusion of not less than 60% hardly causes falling-off of the expanded particles from a cut surface while the expansion-molded body is being cut, and consequently a final product without defects can be easily obtained through casting. The method for measuring the rate of fusion of the expansion-molded body will be described in detail in Examples.

The following will explain the expansion-molded body to be subjected to evaluation of the above-described rate of fusion in accordance with Embodiment 1 of the present invention. The method for obtaining the expansion-molded body from the expandable methyl methacrylate resin particles in accordance with Embodiment 1 of the present invention is not limited to any particular one. For example, the method may be a method in which (A1) to (A6) shown below are carried out in order: (A1) sieving the expandable methyl methacrylate resin particles to collect expandable methyl methacrylate resin particles having a particle diameter of 0.5 mm to 1.4 mm; (A2) pre-expanding the collected expandable methyl methacrylate resin particles with use of a pressure-type pre-expansion machine (available from Obiraki Industry Co., Ltd., "BHP") under a blowing vapor pressure of 0.12 MPa to 0.16 MPa so as to attain a volume magnification of 65 times; (A3) leaving the obtained methyl methacrylate pre-expanded particles at normal temperature for three days; (A4) carrying out in-mold molding on the methyl methacrylate pre-expanded particles having been left through vacuum-heating involving use of a molding machine (available from DAISEN, "PEONY-205DS") under a blowing vapor pressure of 0.05 MPa until an expansion pressure reaches 0.06 MPa; (A5) then cooling a resulting expansion-molded body in the mold for 1000 seconds and taking out the cooled expansion-molded body so as to obtain a block-shaped methyl methacrylate expansion-molded body having a length of 2000 mm, a width of 1000 mm, and a thickness of 525 mm; and (A6) leaving the obtained methyl methacrylate expansion-molded body at normal temperature for three days. In other words, it is preferable that the expansion-molded body obtained by subjecting the expandable methyl methacrylate resin particles in accordance with Embodiment 1 of the present invention to the operations of (A1) to (A6) have a rate of fusion within the above-indicated range.

The expansion-molded body in accordance with Embodiment 1 of the present invention may have the following features: That is, a methyl methacrylate expansion-molded body in accordance with Embodiment 1 of the present invention is a methyl methacrylate expansion-molded body obtained by molding expandable methyl methacrylate pre-expanded particles prepared by pre-expanding expandable methyl methacrylate resin particles, the expandable methyl methacrylate resin particles including: a base resin including, as constitutional units, a methyl methacrylate unit and an acrylic ester unit; and a blowing agent, a content of the methyl methacrylate unit being not less than 91 parts by weight and not more than 99 parts by weight and a content of the acrylic ester unit being not less than 1 part by weight and not more than 9 parts by weight, relative to 100 parts by weight of a total content of the methyl methacrylate unit and the acrylic ester unit in the base resin, the expandable methyl methacrylate resin particles having (a) an average particle diameter of 0.6 mm to 1.0 mm and (b) a particle diameter variation coefficient of not more than 20%, the methyl methacrylate expansion-molded body having a rate of fusion of not less than 60%.

The expansion-molded body in accordance with Embodiment 1 of the present invention may have the following features: That is, a methyl methacrylate expansion-molded body in accordance with Embodiment 1 of the present invention (a) includes a base resin including, as constitutional units, a methyl methacrylate unit and an acrylic ester unit and (b) has a rate of fusion of not less than 60%, a content of the methyl methacrylate unit being not less than 91 parts by weight and not more than 99 parts by weight and a content of the acrylic ester unit being not less than 1 part by weight and not more than 9 parts by weight, relative to 100 parts by weight of a total content of the methyl methacrylate unit and the acrylic ester unit in the base resin.

With the expansion-molded body made of the methyl methacrylate pre-expanded particles in accordance with Embodiment 1 of the present invention, a methyl methacrylate resin residue hardly remains after replacing the expansion-molded body buried in casting sand with a molten metal poured thereto. Therefore, the expansion-molded body made of the methyl methacrylate pre-expanded particles in accordance with Embodiment 1 of the present invention is suitably used as an evaporative pattern.

II. Embodiment 2

The following will describe Embodiment 2 of the present invention. Except for matters described in detail below, the description in [I. Embodiment 1] is cited as appropriate.

Embodiment 2 of the present invention relates to polymethyl methacrylate expandable resin particles (expandable methyl methacrylate resin particles) and pre-expanded particles obtained therewith. Embodiment 2 of the present invention further relates to an evaporative pattern constituted by an expansion-molded body made of methyl methacrylate expanded particles.

The expansion-molded body made of expandable methyl methacrylate expandable resin particles can be used as an evaporative pattern for use in the evaporative pattern casting technique (full mold technique), for example. The full mold technique refers to a technique for producing a casting by burying a pattern made of an expansion-molded body in casting sand and pouring a molten metal thereto so that the pattern is replaced with the molten metal. With the full mold technique involving use of an expansion-molded body made of a polystyrene polymer, soot is often generated during casting, and thus a resulting casting tends to have a residue (defect), disadvantageously. Meanwhile, with use of an expansion-molded body made of a polymethyl methacrylate polymer, soot is less generated during casting. From the viewpoint of reduction of a residue remaining after casting, the expansion-molded body made of the polymethyl methacrylate polymer is used for the full mold technique.

In order that the polymethyl methacrylate expandable resin is suitably used for casting, expandability and formability of the polymethyl methacrylate expandable resin are important. As a method for improving the expandability and formability of the polymethyl methacrylate expandable resin, Patent Literature 4 discloses a method for copolymerizing a methyl methacrylate monomer with another monofunctional unsaturated monomer and another polyfunctional monomer, and Patent Literature 5 discloses a method for setting a cell diameter of an expansion-molded body so as to fall within a range of not less than 70 μm and not more than 200 μm.

Moreover, as a method for obtaining expandable acrylic resin particles having excellent formability, Patent Literature 6 discloses a method for adjusting a component ratio between a methyl methacrylate monomer and an acrylic acid ester monomer and introducing a polycyclic saturated hydrocarbon group into a part of the methyl methacrylate monomer and/or the acrylic acid ester monomer.

Furthermore, Patent Literature 7 discloses a method for reducing unevenness generated during molding by making uniform average cell chord lengths of methyl methacrylate expanded particles from the inside to the surface layer.

According to Patent Literatures 4 and 5, however, elongation viscosity and shear viscosity at the time of melting are inappropriate for the expansion behavior, and cell retaining capability is not insufficient. Thus, the methods of Patent Literatures 4 and 5 have some room for improvements in terms of expandability and formability. According to the method of Patent Literature 6, the expandable resin has a glass transition point far higher than 100° C. Thus, particularly in a case of carrying out pre-expansion with water vapor of less than 100° C. as generally conducted, there is some room for improvements. According to the method of Patent Literature 7, the surface property of the molded body is improved. However, cell breakage is likely to occur in the surface layer of the molded body. Thus, the method of Patent Literature 7 has some room for improvements in terms of fusibility in molding into a block. The method of Patent Literature 8 uses a large amount of acrylic ester, and therefore has some room for improvements in terms of shrinkage of an expansion-molded body.

Particularly, in a case where an expansion-molded body is employed as a casting pattern, cutting an expansion-molded body having poor fusibility may lead to a phenomenon that particles drop off from a poorly-fused part of the expansion-molded body and a defect is caused therein.

In consideration of the above-described circumstances, Embodiment 2 of the present invention provides expandable methyl methacrylate resin particles that can be expanded at a high ratio and that can exhibit good fusibility when being molded at a high expansion ratio. Particularly, Embodiment 2 of the present invention provides expandable methyl methacrylate resin particles suitably applicable to an evaporative pattern for use in metal casting.

The inventors of one or more embodiments of the present invention conducted diligent studies, and consequently completed an invention in accordance with Embodiment 2 of the present invention.

Embodiment 2 of the present invention corresponds to a more preferable aspect of Embodiment 1 of the present invention. In addition to the features of Embodiment 1, Embodiment 2 includes: (a) the feature that the acrylic ester unit is a butyl acrylate unit; (b) the feature that a content of the methyl methacrylate unit is not less than 94 parts by weight and not more than 96 parts by weight and a content of the butyl acrylate unit is not less than 4 parts by weight and not more than 6 parts by weight, relative to 100 parts by weight of a total content of the methyl methacrylate unit and the butyl acrylate unit in the base resin, and (c) an expansion-molded body obtained by pre-expanding and molding the expandable methyl methacrylate resin particles has a rate of fusion of not less than 60% and has, among cells existing in a surface of the expansion-molded body, less than 30 broken cells per $mm^2$.

In other words, the expandable methyl methacrylate resin particles in accordance with Embodiment 2 of the present invention are expandable methyl methacrylate resin particles including: a base resin including, as constitutional units, a methyl methacrylate unit and a butyl acrylate unit; and a blowing agent, a content of the methyl methacrylate unit being not less than 94 parts by weight and not more than 96 parts by weight and a content of the butyl acrylate unit being not less than 4 parts by weight and not more than 6 parts by weight, relative to 100 parts by weight of a total content of the methyl methacrylate unit and the butyl acrylate unit in the base resin, the expandable methyl methacrylate resin particles having (a) an average particle diameter of 0.6 mm to 1.0 mm and (b) a particle diameter variation coefficient of not more than 20%, an expansion-molded body being obtained by pre-expanding and molding the expandable methyl methacrylate resin particles, the expansion-molded body having a rate of fusion of not less than 60% and having, among cells existing in a surface of the expansion-molded body, less than 30 broken cells per $mm^2$.

In accordance with Embodiment 2 of the present invention, it is possible to provide expandable methyl methacrylate resin particles that can be expanded by a high magnification and that can exhibit good fusibility when being molded at a high expansion ratio. In accordance with Embodiment 2 of the present invention, it is possible to provide expandable methyl methacrylate resin particles suitably applicable particularly to an evaporative pattern for use in metal casting.

With the above-described features, the expandable methyl methacrylate resin particles in accordance with Embodiment 2 of the present invention can be expanded by a high magnification and can exhibit excellent fusibility when being formed at a high expansion ratio.

The base resin included in the expandable methyl methacrylate resin particles in accordance with Embodiment 2 of the present invention includes, as constitutional units, the methyl methacrylate unit and the butyl acrylate unit. The "butyl acrylate unit" herein refers to a constitutional unit derived from a butyl acrylate monomer.

The expandable methyl methacrylate resin particles in accordance with Embodiment 2 of the present invention include, as the base resin, a polymer (copolymer) of acrylic monomers including a methyl methacrylate monomer and a butyl acrylate monomer. The amount of the methyl methacrylate monomer to be contained is not less than 94 parts by weight and not more than 96 parts by weight and the amount of the butyl acrylate monomer to be contained is not less than 4 parts by weight and not more than 6 parts by weight, relative to 100 parts by weight of the total amount of the acrylic monomers constituting the base resin. Setting the amount of the methyl methacrylate monomer so as to be not more than 96 parts by weight relative to 100 parts by weight of the total amount of the acrylic monomers constituting the base resin often yields expandable resin particles having more excellent expandability and formability. Consequently, with such expandable resin particles, it is possible to yield an expansion-molded body having a more beautiful surface. Setting the amount of the butyl acrylate monomer component so as to be not more than 6 parts by weight relative to 100 parts by weight of the total amount of the acrylic monomers constituting the base resin often yields an expansion-molded body that hardly shrinks. More preferably, the amount of the methyl methacrylate is not less than 94.5 parts by weight and not more than 95.0 parts by weight and the amount of the butyl acrylate is not less than 5.0 parts by weight and not more than 5.5 parts by weight, relative to 100 parts by weight of the acrylic monomers constituting the base resin.

An expansion-molded body obtained by molding pre-expanded particles (also referred to as expanded particles) prepared by pre-expanding the expandable methyl methacrylate resin particles in accordance with Embodiment 2 of the present invention has a rate of fusion of not less than 60%. The expansion-molded body having a rate of fusion of not less than 60% hardly causes falling-off of the expanded particles from a cut surface while the expansion-molded body is being cut, and consequently a final product without defects can be easily obtained through casting. The rate of fusion of the expansion-molded body may be not less than 70%, or not less than 80%.

The expansion-molded body obtained by molding the pre-expanded particles prepared by pre-expanding the expandable methyl methacrylate resin particles in accordance with Embodiment 2 of the present invention has, among cells existing in a surface of the expansion-molded body, less than 30 broken cells per $mm^2$. In a case where the number of broken cells among the cells existing in the surface of the expansion-molded body is less than 30 per $mm^2$, (a) sufficient expandability can be achieved in molding and therefore the rate of fusion may not be deteriorated, and furthermore (b) the degree(s) of dimensional shrinkage and/or deformation of the expansion-molded body after molding tend(s) to become smaller. The number of broken cells among the cells existing in the surface of the expansion-molded body may be less than 20 per $mm^2$.

Note that the number of broken cells among the cells existing in the surface of the expansion-molded body obtained by molding the pre-expanded particles prepared through pre-expansion of the expandable methyl methacrylate resin particles in accordance with Embodiment 2 of the present invention can be obtained by counting the number of pored parts (cells) on the surface of the expansion-molded body through observation with a scanning-type electron microscopic picture.

The following will explain the expansion-molded body to be subjected to evaluation of the above-described rate of fusion in accordance with Embodiment 2 of the present invention. The method for obtaining the expansion-molded body from the expandable methyl methacrylate resin particles in accordance with Embodiment 2 of the present invention is not limited to any particular one. For example, the method may be a method in which (B1) to (B6) shown below are carried out in order: (B1) sieving the expandable methyl methacrylate resin particles to collect expandable methyl methacrylate resin particles having a particle diameter of 0.5 mm to 1.4 mm; (B2) pre-expanding the collected expandable methyl methacrylate resin particles with use of a pressure-type pre-expansion machine (available from Obiraki Industry Co., Ltd., "BHP") under a blowing vapor pressure of 0.12 MPa to 0.16 MPa so as to attain a volume magnification of 65 times; (B3) leaving the obtained methyl methacrylate pre-expanded particles at normal temperature for three days; (B4) carrying out in-mold molding on the methyl methacrylate pre-expanded particles having been left through vacuum-heating involving use of a molding machine (available from DAISEN, "PEONY-205DS") under a blowing vapor pressure of 0.05 MPa until an expansion pressure reaches 0.06 MPa; (B5) then cooling a resulting expansion-molded body in the mold for 1000 seconds and taking out the cooled expansion-molded body so as to obtain a block-shaped methyl methacrylate expansion-molded body having a length of 2000 mm, a width of 1000 mm, and a thickness of 525 mm; and (B6) leaving the obtained methyl methacrylate expansion-molded body at normal temperature for three days. In other words, it is preferable that the expansion-molded body obtained by subjecting the expandable methyl methacrylate resin particles in accordance with Embodiment 2 of the present invention to the operations of (B1) to (B6) have a rate of fusion within the above-indicated range.

The following will explain the expansion-molded body to be subjected to evaluation of the number of broken cells among the cells existing in the surface of the expansion-molded body in accordance with Embodiment 2 of the present invention. The method for obtaining the expansion-molded body from the expandable methyl methacrylate resin particles in accordance with Embodiment 2 of the present invention is not limited to any particular one. For example, the method may be a method in which (C1) to (C5) shown below are carried out in order: (C1) sieving the expandable methyl methacrylate resin particles to collect expandable methyl methacrylate resin particles having a particle diameter of 0.5 mm to 1.4 mm; (C2) pre-expanding the collected expandable methyl methacrylate resin particles with use of a pressure-type pre-expansion machine (available from Obiraki Industry Co., Ltd., "BHP") under a blowing vapor pressure of 0.12 MPa to 0.16 MPa so as to attain a volume magnification of 65 times; (C3) leaving the obtained methyl methacrylate pre-expanded particles at normal temperature for one day; (C4) carrying out in-mold molding on the methyl methacrylate pre-expanded particles having been left with use of a molding machine (available from DAISEN, "PEONY-205DS") under a blowing vapor pressure of 0.05 MPa so as to obtain a block-shaped methyl methacrylate expansion-molded body having a length of 2000 mm, a width of 1000 mm, and a thickness of 525 mm; and (C5) drying the methyl methacrylate expansion-molded body in a drying chamber at 60° C. for two days. In other words, it is preferable that the expansion-molded body obtained by subjecting the expandable methyl methacrylate resin particles in accordance with Embodiment 2 of the present invention to the operations of (C1) to (C5) have, among the cells existing in the surface of the expansion-molded body, broken cells whose number is within the above-indicated range.

It is preferable that the base resin included in the expandable methyl methacrylate resin particles in accordance with Embodiment 2 of the present invention further include, as a constitutional unit, a bifunctional monomer unit.

In Embodiment 2 of the present invention, in a case where the total amount of the methyl methacrylate monomer and the butyl acrylate monomer is assumed as 100 parts by weight, it is preferable to use the bifunctional monomer to reduce a residue remaining after burning and to adjust the molecular weight. Examples of the bifunctional monomer encompass the bifunctional monomers described in [I. Embodiment 1].

The bifunctional monomer may be hexanediol di(meth)acrylate, since this facilitates adjustment of the molecular weight. In Embodiment 2 of the present invention, the amount of the bifunctional monomer to be used may be not less than 0.05 parts by weight and not more than 0.15 parts by weight, or not less than 0.08 parts by weight and not more than 0.13 parts by weight, relative to 100 parts by weight of the total amount of the methyl methacrylate monomer and the butyl acrylate monomer. Setting the used amount of the bifunctional monomer unit within the above range can yield expandable resin particles having excellent expandability and formability. By using the expandable resin particles, it is possible to obtain an expansion-molded body with which a residue hardly remains after casting (burning) and which has excellent rigidity.

The expandable methyl methacrylate resin particles in accordance with Embodiment 2 of the present invention may have a weight average molecular weight in terms of polystyrene measured by gel permeation chromatography (GPC) of not less than 300,000 and not more than 400,000, or not less than 330,000 and not more than 370,000. With use of the expandable resin particles having a weight average molecular weight set so as to fall within the above range, it is possible to obtain an expansion-molded body with which a residue hardly remains after casting (burning) and which has excellent surface property.

The method in accordance with Embodiment 2 of the present invention for producing expandable resin particles may be suspension polymerization according to which polymerization is carried out in an aqueous suspension.

One example of the method in accordance with Embodiment 2 of the present invention for producing expandable methyl methacrylate resin particles is a method for producing expandable methyl methacrylate resin particles, including the steps of: (a) copolymerizing acrylic monomers including a methyl methacrylate monomer and a butyl acrylate monomer to obtain a copolymer; and (b) impregnating a blowing agent in the copolymer thus obtained, wherein in the step (a), an amount of the methyl methacrylate monomer to be added is not less than 94 parts by weight and not more than 96 parts by weight and an amount of the butyl acrylate monomer to be added is not less than 4 parts by weight and not more than 6 parts by weight, relative to 100 parts by weight of a total amount of the methyl methacrylate monomer and the butyl acrylate monomer to be added, and in the step (a), the monomers are added to an aqueous medium to initiate a polymerization reaction of the monomers, the aqueous medium containing a poorly water-soluble inorganic salt in an amount of not less than 0.08 parts by weight and not more than 0.20 parts by weight relative to 100 parts by weight of the monomers, and at a timing when a polymerization conversion rate is not less than 30% and not more than 70%, a poorly water-soluble inorganic salt is added thereto in an amount of not less than 0.08 parts by weight and not more than 0.50 parts by weight relative to 100 parts by weight of the monomers, and the expandable methyl methacrylate resin particles have an average particle diameter of 0.6 mm to 1.0 mm. Note that the "copolymer" in the method in accordance with Embodiment 2 of the present invention for producing the expandable methyl methacrylate resin particles corresponds to the "base resin" included in the above-described expandable methyl methacrylate resin particles in accordance with Embodiment 2.

The copolymerization step may be carried out through suspension polymerization according to which the acrylic monomers are copolymerized in an aqueous suspension.

The "aqueous suspension" in accordance with Embodiment of the present invention refers to a liquid prepared by dispersing, in water or an aqueous solution, resin particles and monomer droplets through stirring and/or the like. In the aqueous suspension, a water-soluble surfactant and monomer may be dissolved. Alternatively, in the aqueous suspension, a dispersion agent, a polymerization initiator, a chain transfer agent, a crosslinking agent, a cell adjusting agent, a flame retardant, a solvent, a plasticizer, and/or the like, each of which is water-insoluble, may be dispersed together with a monomer.

The weight ratio between the resin (the methyl methacrylate resin, which may be rephrased as the copolymer) and the water in the aqueous suspension may be 1.0/0.6 to 1.0/3.0, in terms of the ratio of the resulting methyl methacrylate resin with respect to the water.

Hereinafter, the copolymer (base resin) obtained in the copolymerization step may simply be referred to as "resin particles", occasionally.

Examples of the dispersion agent usable in suspension polymerization in Embodiment 2 of the present invention encompass (a) poorly water-soluble inorganic salts such as tricalcium phosphate, magnesium pyrophosphate, hydroxyapatite, and kaolin and (b) water-soluble polymers such as polyvinyl alcohol, methylcellulose, polyacrylamide, and polyvinyl pyrrolidone. In a case where a poorly water-soluble inorganic salt is used as the dispersion agent, it is preferable to use an anionic surfactant such as α-olefinsulfonic acid soda or dodecylbenzenesulfonic acid soda in combination with the poorly water-soluble inorganic salt. These dispersion agents may be added during polymerization, as needed.

The dispersion agent used in suspension polymerization in Embodiment 2 of the present invention may be a poorly water-soluble inorganic salt, at least one kind selected from the group consisting of tricalcium phosphate, magnesium pyrophosphate, hydroxyapatite, and kaolin, at least one kind selected from the group consisting of tricalcium phosphate, hydroxyapatite, and kaolin, or tricalcium phosphate. This feature can provide enhanced protection of the resin particles and/or the monomer droplets, thereby making it possible to prevent or reduce coalescence of the resin particles, advantageously.

In the suspension polymerization in accordance with Embodiment 2 of the present invention, it is preferable to use tricalcium phosphate, which is a poorly water-soluble inorganic salt, and α-olefinsulfonic acid soda, which is an anionic surfactant, since use of them can prevent or reduce collision between the resin particles.

In Embodiment 2 of the present invention, in a case where the dispersion agent is added to the aqueous suspension during polymerization, the dispersion agent may be a poorly water-soluble inorganic salt, at least one kind selected from the group consisting of tricalcium phosphate, hydroxyapatite, and kaolin, or tricalcium phosphate. With this feature, it is possible to prevent coalescence of the resin particles at the time of and after addition of the dispersion agent, thereby making it possible to yield resin particles having a target particle diameter.

For the purpose of obtaining an expansion-molded body that is prepared by pre-expanding and molding the expandable methyl methacrylate resin particles and that has a rate of fusion of not less than 60% and has, among cells existing in its surface, less than 30 broken cells per $mm^2$ as in Embodiment 2 of the present invention, it is important to obtain the expandable methyl methacrylate resin particles in the following manner. Specifically, the expandable methyl methacrylate resin particles are obtained by a method including: adding the monomer components to the aqueous suspension (corresponding to the aqueous medium) containing the poorly water-soluble inorganic salt in an amount of not less than 0.08 parts by weight and not more than 0.20 parts by weight relative to 100 parts by weight of the base resin so as to initiate polymerization; and, at a timing when a polymerization conversion rate is not less than 30% and not more than 70%, further adding tricalcium phosphate thereto in an amount of not less than 0.08 parts by weight and not more than 0.50 parts by weight. The addition of tricalcium phosphate to the aqueous suspension after the polymerization is initiated may be carried out in an amount of not less than 0.08 parts by weight and not more than 0.50 parts by weight and at a timing when the polymerization conversion rate is not less than 40% and not more than 50%, since, with this feature, it is likely to yield expandable methyl methacrylate resin particles having an average particle diameter with which a favorable balance between expandability and formability can be attained.

The expandable methyl methacrylate resin particles obtained through the above method tend to be transformed, through pre-expansion, into pre-expanded particles having a surface with a thick cell film. Consequently, broken cells in the surface of the pre-expanded particles are reduced therein. Thus, when the pre-expanded particles are subjected to molding, the pre-expanded particles exhibit high expandability in the mold. Consequently, it is possible to obtain an expansion-molded body having favorable fusibility. In addition, generally, in a case where the temperature inside an expansion machine during pre-expansion is high (for example, a temperature exceeding 102° C.), resulting pre-expanded particles tend to have a surface with a thin cell film. With the expandable methyl methacrylate resin particles obtained through the above-described method, it is possible to prevent or reduce cell breakage in the surface of resulting pre-expanded particles even when the temperature inside the expansion machine during pre-expansion is high.

In a case where pre-expanded particles obtained by pre-expanding the expandable methyl methacrylate resin particles have a surface with a cell film thickness of less than 0.2 μm, cell breakage is likely to occur. Therefore, the pre-expanded particles may have a surface with a cell film thickness of not less than 0.2 μm. With the expandable methyl methacrylate resin particles produced by the above-described method, it is possible to obtain pre-expanded particles having a surface with a cell film thickness of not less than 0.2 μm. It is particularly preferable that the expanded particles have a surface with a cell film thickness of not less than 0.4 μm.

The amount of the dispersion agent to be used is determined depending on the type of the dispersion agent. The amount of the poorly water-soluble inorganic salt to be used may be not less than 0.02 parts by weight and not more than 1.0 part by weight, relative to 100 parts by weight of water. The amount of the anionic surfactant and/or the water-soluble polymer to be used may be not less than 30 ppm and not more than 100 ppm.

The suspension polymerization in accordance with Embodiment 2 of the present invention may include carrying out polymerization of a first stage so that a major polymerization reaction takes place and then carrying out a polymerization reaction of a second stage at a temperature higher than that of the first stage so that a remaining monomer is reduced.

As the kind and amount of the polymerization initiator to be used and preferable aspects thereof, the aspects described in [I. Embodiment 1] can be employed.

For the polymerization in Embodiment 2 of the present invention, it is preferable to use, as the chain transfer agent, a known chain transfer agent usable for polymerization of the methyl methacrylate resin. As the kind and amount of the chain transfer agent to be used and preferable aspects thereof, the aspects described in [I. Embodiment 1] can be employed.

As the kind and amount of the blowing agent to be used in the blowing agent impregnation step in accordance with Embodiment 2 of the present invention and preferable aspects thereof, the aspects described in [I. Embodiment 1] can be employed.

Hereinafter, the copolymer (base resin) obtained in the copolymerization step may be simply referred to as "resin particles", occasionally.

The blowing agent may be impregnated in the resin particles at a timing when the polymerization conversion rate of the resin particles is not less than 80% and not more than 95%. In a case where the polymerization conversion rate at the time of impregnation of the blowing agent is within the above range, agglomeration of the resin particles hardly occurs in the blowing agent impregnation step, the expandable resin particles can be obtained at a high yield, and an expansion-molded body obtained with use of pre-expanded particles produced by expanding the expandable resin particles achieves good surface smoothness.

In other words, the blowing agent impregnation step may be carried out or initiated at a timing when the polymerization conversion rate is not less than 80% and not more than 95%.

The impregnation temperature at the time of impregnating the blowing agent in the resin particles (i.e., at the time of the blowing agent impregnation step) may be not less than 95° C. and not more than 120° C., or not less than 100° C. and not more than 117° C. In a case where the impregnation temperature is within the above range, impregnation equipment, which is heavy equipment, is not necessary for production of the expandable resin particles, and an expansion-molded body obtained with use of pre-expanded particles produced by expanding the expandable resin particles achieves good surface smoothness.

An additive that can be used in Embodiment 2 of the present invention may be a solvent, a plasticizer, a cell adjusting agent, and/or the like, which can be selected depending on the purpose.

The solvent may be a solvent having a boiling point of not lower than 50° C., examples of which encompass (a) C6 (6 carbon atoms) or more aliphatic hydrocarbon such as toluene, hexane, and heptane and (b) C6 or more alicyclic hydrocarbon such as cyclohexane and cyclooctane. The solvent having a boiling point of not lower than 50° C. may be toluene or cyclohexane in order to obtain expandable resin particles having excellent expandability. The amount of the solvent to be used may be not less than 1.5 parts by weight and not more than 3.0 parts by weight, relative to 100 parts by weight of the monomers. By setting the used amount of the solvent so as to fall within the above range, it is possible to obtain expandable resin particles having excellent expandability. In addition, with use of pre-expanded particles produced by expanding the expandable resin particles, it is possible to obtain an expansion-molded body having high dimensional stability. It is preferable that the solvent component having a boiling point of not lower than 50° C. be added to the aqueous suspension immediately before the blowing agent is impregnated in the resin particles or at the same time when the blowing agent is added.

As the plasticizer and preferable aspects thereof, the aspects described in [I. Embodiment 1] can be employed.

Examples of the cell adjusting agent encompass (a) aliphatic bisamide such as methylene-bis-stearic acid amide and ethylene-bis-stearic acid amide and (b) polyethylene wax.

The expandable methyl methacrylate resin particles in accordance with Embodiment 2 of the present invention may have an average particle diameter of 0.6 mm to 1.0 mm, or 0.7 mm to 0.9 mm. With an average particle diameter of less than 0.6 mm, expandability in pre-expansion is impaired and/or blocking is increased. With an average particle diameter exceeding 1.0 mm, the expansion power of the expandable methyl methacrylate resin particles becomes too high. Consequently, at the time of molding with use of pre-expanded particles obtained by expanding the expandable methyl methacrylate resin particles, the surface of a molded body is formed instantly and accordingly vapor does not reach the inside of the molded product, which causes poor fusion inside the molded body.

In Embodiment 2 of the present invention, the average particle diameter of the expandable methyl methacrylate resin particles means an average particle diameter in terms of volume. The average particle diameter can also be expressed as a volume-average particle diameter. The method for measuring the average particle diameter and the like will be described in detail in Examples.

The expandable methyl methacrylate resin particles thus obtained can be transformed into expanded particles (herein, also referred to as "methyl methacrylate expanded particles") by a general pre-expansion method. Specifically, the expandable resin particles are put into a container provided with a stirrer. Then, the expandable resin particles are heated by a heat source such as water vapor, so that the expandable resin particles are pre-expanded to attain a desired volume magnification. Consequently, it is possible to attain pre-expanded particles. For the water vapor used in pre-expansion, the blowing vapor pressure may be set so as to fall within a range of 0.08 MPa to 0.12 MPa. The temperature inside the pre-expansion machine may be set so as to fall within a range of 100° C. to 105° C.

In addition, the methyl methacrylate pre-expanded particles can be molded into an expansion-molded body by a general in-mold molding method. Specifically, the methyl methacrylate pre-expanded particles are charged in a mold that can be closed but cannot be sealed. Then, the methyl methacrylate pre-expanded particles are heated by water vapor so as to be fused to each other. Consequently, an expansion-molded body is obtained. For the water vapor used in in-mold molding, the blowing vapor pressure may be set so as to fall within a range of 0.05 MPa to 0.10 MPa.

An expansion-molded body obtained by pre-expanding and molding the expandable methyl methacrylate resin particles in accordance with Embodiment 2 of the present invention may have, in a range 200 μm inside from a surface thereof, cells having an average chord length of not less than 40 μm and not more than 130 μm, not less than 40 μm and not more than 100 μm, or not less than 46 μm and not more than 70 μm. With the average chord length within the above range, it is possible to obtain an expansion-molded body in which cell breakage is reduced and which exhibit favorable fusibility.

The following will explain the expansion-molded body to be subjected to evaluation of the above-described average chord length of the cells in the range 200 μm inside from the surface of the expansion-molded body in accordance with Embodiment 2 of the present invention. The method for obtaining the expansion-molded body from the expandable methyl methacrylate resin particles in accordance with Embodiment 2 of the present invention is not limited to any particular one. For example, the method may be a method in which (D1) to (D5) shown below are carried out in order: (D1) sieving the expandable methyl methacrylate resin particles to collect expandable methyl methacrylate resin particles having a particle diameter of 0.5 mm to 1.4 mm; (D2) pre-expanding the collected expandable methyl methacrylate resin particles with use of a pressure-type pre-expansion machine (available from Obiraki Industry Co., Ltd., "BHP") under a blowing vapor pressure of 0.12 MPa to 0.16 MPa so as to attain a volume magnification of 65 times; (D3) leaving the obtained methyl methacrylate pre-expanded particles at normal temperature for one day; (D4) carrying out in-mold molding on the methyl methacrylate pre-expanded particles having been left through vacuum-heating involving use of a molding machine (available from DAISEN, "PEONY-205DS") under a blowing vapor pressure of 0.05 MPa until an expansion pressure reaches 0.06 MPa; and (D5) then cooling a resulting expansion-molded body in the mold for 1000 seconds and taking out the cooled expansion-molded body so as to obtain a block-shaped methyl methacrylate expansion-molded body having a length of 2000 mm, a width of 1000 mm, and a thickness of 525 mm. In other words, it is preferable that the expansion-molded body obtained by subjecting the expandable methyl methacrylate resin particles in accordance with Embodiment 2 of the present invention to the operations of (D1) to (D5) have, in a range 200 μm inside from a surface of the expansion-molded body, a cell diameter average chord length within the above-described range.

The expansion-molded body in accordance with Embodiment 2 of the present invention may have the following features: That is, a methyl methacrylate expansion-molded body in accordance with Embodiment 2 of the present invention is a methyl methacrylate expansion-molded body produced by molding expandable methyl methacrylate pre-expanded particles obtained through pre-expansion of expandable methyl methacrylate resin particles, the expandable methyl methacrylate resin particles including: a base resin including, as constitutional units, a methyl methacrylate unit and a butyl acrylate unit; and a blowing agent, a content of the methyl methacrylate unit being not less than 94 parts by weight and not more than 96 parts by weight and a content of the butyl acrylate unit being not less than 4 parts by weight and 6 not more than parts by weight, relative to 100 parts by weight of a total content of the methyl methacrylate unit and the butyl acrylate unit in the base resin, the expandable methyl methacrylate resin particles having (a) an average particle diameter of 0.6 mm to 1.0 mm and (b) a particle diameter variation coefficient of not more than 20%, the methyl methacrylate expansion-molded body having a rate of fusion of not less than 60% and having, among cells existing in its surface, less than 30 broken cells per mm$^2$.

The expansion-molded body in accordance with Embodiment 2 of the present invention may have the following features: That is, a methyl methacrylate expansion-molded body in accordance with Embodiment 2 of the present invention (a) includes a base resin including, as constitutional units, a methyl methacrylate unit and a butyl acrylate unit, (b) has a rate of fusion of not less than 60%, and (c) has, among cells existing in its surface, less than 30 broken cells per mm$^2$, a content of the methyl methacrylate unit being not less than 94 parts by weight and not more than 96 parts by weight and a content of the butyl acrylate unit being not less than 4 parts by weight and not more than 6 parts by weight, relative to 100 parts by weight of a total content of the methyl methacrylate unit and the butyl acrylate unit in the base resin.

With the expansion-molded body made of the methyl methacrylate pre-expanded particles in accordance with Embodiment 2 of the present invention, a methyl methacrylate resin residue hardly remains after replacing the expansion-molded body buried in casting sand with a molten metal poured thereto, since the methyl methacrylate resin itself has a low ceiling temperature. Thus, the expansion-molded body made of the methyl methacrylate pre-expanded particles in accordance with Embodiment 2 of the present invention is suitably employed as an evaporative pattern. Note that the ceiling temperature means a temperature at which decomposition of the methyl methacrylate resin (i.e., depolymerization into a methyl methacrylate monomer) occurs.

One or more embodiments of the present invention may have the following features.

[X1] Expandable methyl methacrylate resin particles include: a base resin including, as constitutional units, a methyl methacrylate unit and an acrylic ester unit; and a blowing agent, a content of the methyl methacrylate unit being not less than 91 parts by weight and not more than 99 parts by weight and a content of the acrylic ester unit being not less than 1 part by weight and not more than 9 parts by weight, relative to 100 parts by weight of a total content of the methyl methacrylate unit and the acrylic ester unit in the base resin, the expandable methyl methacrylate resin particles having (a) an average particle diameter of 0.6 mm to 1.0 mm and (b) a particle diameter variation coefficient of not more than 20%.

[X2] The expandable methyl methacrylate resin particles described in [X1], wherein the acrylic ester unit is a butyl acrylate unit.

[X3] The expandable methyl methacrylate resin particles described in [X2], wherein a content of the methyl methacrylate unit is not less than 94 parts by weight and not more than 96 parts by weight and a content of the butyl acrylate unit is not less than 4 parts by weight and not more than 6 parts by weight, relative to 100 parts by weight of a total content of the methyl methacrylate unit and the butyl acrylate unit in the base resin, and an expansion-molded body obtained by pre-expanding and molding the expandable methyl methacrylate resin particles has a rate of fusion of not less than 60% and has, among cells existing in a surface of the expansion-molded body, less than 30 broken cells per mm$^2$.

[X4] The expandable methyl methacrylate resin particles described in any one of [X1] to [X3], wherein the base resin further includes, as a constitutional unit, a bifunctional monomer unit, and a content of the bifunctional monomer unit is not less than 0.05 parts by weight and not more than 0.15 parts by weight, relative to 100 parts by weight of the total content of the methyl methacrylate unit and the acrylic ester unit.

[X5] The expandable methyl methacrylate resin particles described in any one of [X1] to [X4], wherein the expandable methyl methacrylate resin particles have a weight average molecular weight in terms of polystyrene measured by gel permeation chromatography (GPC) of not less than 300,000 and not more than 400,000.

[X6] Methyl methacrylate resin pre-expanded particles produced by expanding the expandable methyl methacrylate resin particles recited in any one of [X1] to [X5].

[X7] A methyl methacrylate expansion-molded body produced by carrying out in-mold molding on the methyl methacrylate resin pre-expanded particles recited in [X6].

[X8] The methyl methacrylate expansion-molded body described in [X7], wherein the methyl methacrylate expansion-molded body has, in a range of 200 μm inside from a surface thereof, cell diameters having an average chord length in a range of 40 μm to 130 μm.

[X9] An evaporative pattern including the methyl methacrylate expansion-molded body recited in [X7] or [X8].

[X10] A method for producing expandable methyl methacrylate resin particles includes the steps of: (a) copolymerizing monomers including a methyl methacrylate monomer and an acrylic ester monomer to obtain a copolymer; and (b) impregnating a blowing agent in the copolymer thus obtained, wherein in the step (a), an amount of the methyl methacrylate monomer to be added is not less than 91 parts by weight and not more than 99 parts by weight and an amount of the acrylic ester monomer to be added is not less than 1 part by weight and not more than 9 parts by weight, relative to 100 parts by weight of a total amount of the methyl methacrylate monomer and the acrylic ester monomer to be added, and in the step (a), the monomers are added to an aqueous medium to initiate a polymerization reaction of the monomers, the aqueous medium containing a poorly water-soluble inorganic salt in an amount of not less than 0.08 parts by weight and not more than 0.20 parts by weight relative to 100 parts by weight of the monomers, and at a timing when a polymerization conversion rate is not less than 35% and not more than 70%, a poorly water-soluble inorganic salt is added thereto in an amount of not less than 0.08 parts by weight and not more than 0.50 parts by weight relative to 100 parts by weight of the monomers, and the expandable methyl methacrylate resin particles have an average particle diameter of 0.6 mm to 1.0 mm.

[X11] The method described in [X10] for producing the expandable methyl methacrylate resin particles, wherein the monomers further include a bifunctional monomer, and an amount of the bifunctional monomer to be added is not less than 0.05 parts by weight and not more than 0.15 parts by weight, relative to 100 parts by weight of the total amount of the methyl methacrylate monomer and the acrylic ester monomer to be added.

[X12] The method described in [X10] or [X11] for producing the expandable methyl methacrylate resin particles, wherein the acrylic ester monomer is butyl acrylate.

One or more embodiments of the present invention may have the following features.

[Y1] Expandable methyl methacrylate resin particles include: a base resin including, as constitutional units, a methyl methacrylate unit and an acrylic ester unit; and a blowing agent, a content of the methyl methacrylate unit being not less than 90 parts by weight and not more than 99 parts by weight and a content of the acrylic ester unit being not less than 1 part by weight and not more than 10 parts by weight, relative to 100 parts by weight of a total content of the methyl methacrylate unit and the acrylic ester unit in the base resin, the expandable methyl methacrylate resin particles having (a) an average particle diameter of 0.6 mm to 1.0 mm and (b) a particle diameter variation coefficient of not more than 20%.

[Y2] The expandable methyl methacrylate resin particles described in [Y1], wherein the acrylic ester unit is a butyl acrylate unit.

[Y3] The expandable methyl methacrylate resin particles described in [Y1] or [Y2], wherein the base resin further includes, as a constitutional unit, a bifunctional monomer unit, and a content of the bifunctional monomer unit is not less than 0.05 parts by weight and not more than 0.15 parts by weight, relative to 100 parts by weight of the total content of the methyl methacrylate unit and the acrylic ester unit.

[Y4] Methyl methacrylate resin pre-expanded particles produced by expanding the expandable methyl methacrylate resin particles recited in any one of [Y1] to [Y3].

[Y5] A methyl methacrylate expansion-molded body produced by carrying out in-mold molding on the methyl methacrylate resin pre-expanded particles recited in [Y4].

[Y6] A method for producing expandable methyl methacrylate resin particles includes the steps of: (a) copolymerizing monomers including a methyl methacrylate monomer and an acrylic ester monomer to obtain a copolymer; and (b) impregnating a blowing agent in the copolymer thus obtained, wherein in the step (a), an amount of the methyl methacrylate monomer to be added is not less than 90 parts by weight and not more than 99 parts by weight and an amount of the acrylic ester monomer to be added is not less than 1 part by weight and not more than 10 parts by weight, relative to 100 parts by weight of a total amount of the methyl methacrylate monomer and the acrylic ester monomer to be added, and in the step (a), the monomers and a polymerization initiator are added to an aqueous medium to initiate a polymerization reaction of the monomers, the aqueous medium containing a poorly water-soluble inorganic salt in an amount of not less than 0.08 parts by weight and not more than 0.20 parts by weight relative to 100 parts by weight of the monomers, and at a timing when a polymerization conversion rate is not less than 35% and not more than 70%, tricalcium phosphate is added thereto in an amount of not less than 0.08 parts by weight and not more than 0.50 parts by weight relative to 100 parts by weight of the monomers.

[Y7] The method described in [Y6] for producing the expandable methyl methacrylate resin particles, wherein the monomers further include a bifunctional monomer, and an amount of the bifunctional monomer to be added is not less than 0.05 parts by weight and not more than 0.15 parts by weight, relative to 100 parts by weight of the total amount of the methyl methacrylate monomer and the acrylic ester monomer to be added.

[Y8] The method described in [Y6] or [Y7] for producing the expandable methyl methacrylate resin particles, wherein the acrylic ester monomer is butyl acrylate.

One or more embodiments of the present invention may have the following features.

[Z1] Expandable methyl methacrylate resin particles include a base resin including, as constitutional units, a methyl methacrylate unit and a butyl acrylate unit, a content of the methyl methacrylate unit being not less than 94 parts by weight and not more than 96 parts by weight and a content of the butyl acrylate unit being not less than 4 parts by weight and not more than 6 parts by weight, relative to 100 parts by weight of a total content of the methyl methacrylate unit and the butyl acrylate unit in the base resin, an expansion-molded body being obtained by pre-expanding and molding the expandable methyl methacrylate resin particles, the expansion-molded body having a rate of fusion of not less than 60% and having, among cells existing in a surface of the expansion-molded body, less than 30 broken cells per $mm^2$.

[Z2] The expandable methyl methacrylate resin particles described in [Z1], wherein the base resin further includes, as a constitutional unit, a bifunctional monomer unit, and a content of the bifunctional monomer unit is not less than 0.05 parts by weight and not more than 0.15 parts by weight, relative to 100 parts by weight of the total content of the methyl methacrylate unit and the butyl acrylate unit in the base resin.

[Z3] The expandable methyl methacrylate resin particles described in [Z1] or [Z2], wherein the expandable methyl methacrylate resin particles have a weight average molecular weight in terms of polystyrene measured by gel permeation chromatography (GPC) of not less than 300,000 and not more than 400,000.

[Z4] An expansion-molded body produced by pre-expanding and molding the expandable methyl methacrylate resin particles recited in any one of [Z1] to [Z3].

[Z5] The expansion-molded body described in [Z4], wherein the methyl methacrylate expansion-molded body has, in a range of 200 μm inside from a surface thereof, cell diameters having an average chord length in a range of 40 μm to 130 μm.

[Z6] An evaporative pattern including the expansion-molded body recited in [Z4] or [Z5].

EXAMPLES

Example A

The following will show Example A and Comparative Example A. However, Embodiment 1 of the present invention is not limited by them.

(Yield of Expandable Methyl Methacrylate Resin Particles)

Relative to 100 weight % of the amount of the expandable methyl methacrylate resin particles obtained through polymerization, a percentage of the weight of the expandable methyl methacrylate resin particles having a particle diameter of 0.5 mm to 1.4 mm collected by sieving was obtained as a yield. The yield obtained was evaluated based on the following criteria.

Excellent: Not less than 95 weight %.
Good: Not less than 90 weight % and less than 95 weight %.
Poor: Less than 90 weight %.

(Polymerization Conversion Rate of Expandable Methyl Methacrylate Resin Particles)

During polymerization, a sample was taken from an aqueous suspension, the aqueous suspension thus taken as a sample was filtered, and the weight of a resin component remaining on filter paper was measured (weight before heating). Next, a polymerization inhibitor was added to the resin component, and then the resin component was heated at 150° C. for 30 minutes, so that a volatile component was removed therefrom. Thereafter, the weight of a resulting resin component was measured (weight after heating). A polymerization conversion rate was calculated in accordance with the following formula.

Polymerization conversion rate (%)=weight after heating/weight before heating×100.

(Average Particle Diameter and Coefficient of Variation of Expandable Methyl Methacrylate Resin Particles)

With use of an image-processing-type Millitrack JPA particle size analyzer, the particle diameter in terms of volume of the expandable methyl methacrylate resin particles was measured. The result thus obtained was displayed by way of cumulative distribution, and a particle diameter corresponding to a volume accumulation of 50% was obtained as an average particle diameter. In addition, a standard deviation in terms of volume was obtained as a result of the measurement. With use of the standard deviation thus obtained, a coefficient of variation was calculated in accordance with the following formula.

Coefficient of variation(%)=(standard deviation in terms of volume/average particle diameter)×100.

(Expandability a of Expandable Methyl Methacrylate Resin Particles)

The expandable methyl methacrylate resin particles were put into a steamer set at 100° C., and were then heated for five minutes. Consequently, methyl methacrylate pre-expanded particles were obtained. 10 g of the methyl methacrylate pre-expanded particles thus obtained was put into a 1000 cm$^3$ measuring cylinder, and the volume (cm$^3$) of the methyl methacrylate pre-expanded particles was measured. A volume magnification (times) was measured in accordance with the following formula:

Volume magnification (times)=volume (cm$^3$) of methyl methacrylate pre-expanded particles/10 g.

Based on the volume magnification thus obtained, the expandability A was evaluated in accordance with the following criteria.

Excellent: Not less than 50 times.
Good: Not less than 40 times and less than 50 times.
Poor: Less than 40 times.

(Amount of Blocking of Methyl Methacrylate Pre-Expanded Particles)

Expandable methyl methacrylate resin particles were pre-expanded with use of a pressure-type pre-expansion machine (available from Obiraki Industry Co., Ltd., "BHP") under a blowing vapor pressure of 0.12 MPa to 0.16 MPa so as to attain a volume magnification of 65 times. Then, the amount of blocking generated as a result of the pre-expansion was measured.

Amount of blocking(%)=weight of blocking generated/weight of methyl methacrylate resin particles subjected to expansion.

Here, the weight of blocking was measured in the following manner. The whole amount of the methyl methacrylate pre-expanded particles thus obtained was put onto a mesh having a mesh size of approximately 10 mm, so as to be subjected to sieving. The weight of the methyl methacrylate pre-expanded particles remaining on the mesh was measured as the weight of blocking.

Based on the amount of blocking thus obtained, the amount of blocking was evaluated in accordance with the following criteria.

Excellent: The amount of blocking generated was 0%, and blocking was not generated at all.
Good: The amount of blocking generated was more than 0% and less than 0.05%.
Poor: The amount of blocking generated was not less than 0.05%.

(Fusibility of Methyl Methacrylate Expansion-Molded Body)

The expandable methyl methacrylate resin particles were sieved to collect expandable methyl methacrylate resin particles having a particle diameter of 0.5 mm to 1.4 mm.

The expandable methyl methacrylate resin particles thus collected were pre-expanded with use of a pressure-type pre-expansion machine (available from Obiraki Industry Co., Ltd., "BHP") under a blowing vapor pressure of 0.12 MPa to 0.16 MPa so as to attain a volume magnification of 65 times. Thereafter, the pre-expanded particles thus obtained were left at normal temperature for three days, so that methyl methacrylate pre-expanded particles were obtained.

The methyl methacrylate pre-expanded particles thus obtained were subjected to in-mold molding with use of a molding machine (available from DAISEN, "PEONY-205DS") under a blowing vapor pressure of 0.05 MPa, so that a block-shaped expansion-molded body having a thickness of 525 mm, a length of 2000 mm, and a width of 1000 mm was obtained. The expansion-molded body thus obtained was left at normal temperature for three days after molding. After three days passed since molding, the expansion-molded body was broken in its thickness direction. Next, the broken surface was observed, so that a rate of fusion, which is a percentage of particles broken at a portion being not a particle-to-particle interface with respect to the total number of particles constituting the broken surface, was calculated in accordance with the following formula.

Rate of fusion(%)=the number of particles broken at a portion being not particle-to-particle interface/ the number of particles constituting the broken surface×100.

Based on the rate of fusion (%) thus obtained, fusibility was evaluated in accordance with the following criteria.

Excellent: The percentage of the particles broken at a portion being not the particle-to-particle interface was not less than 80%.

Good: The percentage of the particles broken at a portion being not the particle-to-particle interface was not less than 60% and less than 80%.

Poor: The percentage of the particles broken at a portion being not the particle-to-particle interface was less than 60%.

Example A1

A 6 L-autoclave with a stirrer was charged with 150 parts by weight of water, 0.15 parts by weight of tricalcium phosphate as a poorly water-soluble inorganic salt, 0.0075 parts by weight of α-olefinsulfonic acid soda, 0.08 parts by weight of lauroyl peroxide, 0.1 parts by weight of 1,1-bis (t-butyl peroxy)cyclohexane, 0.1 parts by weight of 1,6-hexanediol diacrylate, and 0.24 parts by weight of n-dodecanethiol. Thereafter, 95 parts by weight of methyl methacrylate, 5 parts by weight of butyl acrylate, and 1 part by weight of toluene were charged into the autoclave, that is, into the aqueous medium (aqueous suspension) containing the poorly water-soluble inorganic salt, and the aqueous suspension was heated to a temperature of 80° C., so that polymerization was carried out (copolymerization step). At a timing when 1 hour and 45 minutes had elapsed since the polymerization was initiated, 0.12 parts by weight of tricalcium phosphate was further added to the aqueous suspension. The polymerization conversion rate at that time (the timing when 1 hour and 45 minutes had elapsed since the polymerization was initiated) was 43%.

At a timing when 2 hours and 35 minutes had elapsed since then, 1.5 parts by weight of cyclohexane and 9 parts of normal rich butane (normal/iso=70/30) were charged into the aqueous suspension. Thereafter, the aqueous suspension was heated to a temperature of 101° C., so that polymerization and impregnation of the blowing agent were carried out for 10 hours (copolymerization step and blowing agent impregnation step). After that, the aqueous suspension was cooled. After cooling, a resulting product was cleaned, dehydrated, and dried. Consequently, expandable methyl methacrylate resin particles were obtained.

The expandable methyl methacrylate resin particles thus obtained were sieved to collect expandable methyl methacrylate resin particles having a particle diameter of 0.5 mm to 1.4 mm. The expandable methyl methacrylate resin particles were pre-expanded with use of a pressure-type pre-expansion machine (available from Obiraki Industry Co., Ltd., "BHP"), so that pre-expanded particles expanded by a magnification of 65 times were obtained.

Next, the expanded particles were subjected to in-mold molding involving use of a molding machine (available from DAISEN, "PEONY-205DS"), so that an expansion-molded body was obtained with a mold having a size of 2000 mm×1000 mm×525 mm.

In accordance with the above-described method, the yield, the expandability, and the amount of blocking of the expandable methyl methacrylate resin particles and the fusibility of the expansion-molded body were evaluated. The result of the evaluation is shown in Table 1.

Example A2

The same operations as those in Example A1 were carried out, except that the monomers to be used were changed to 97 parts by weight of methyl methacrylate and 3 parts by weight of butyl acrylate. As a result, expandable methyl methacrylate resin particles, pre-expanded particles, and an expansion-molded body were obtained. Then, evaluation thereof was conducted in the same manner as in Example A1. The result of the evaluation is shown in Table 1.

Example A3

The same operations as those in Example A1 were carried out, except that the monomers to be used were changed to 93 parts by weight of methyl methacrylate and 7 parts by weight of butyl acrylate. As a result, expandable methyl methacrylate resin particles, pre-expanded particles, and an expansion-molded body were obtained. Then, evaluation thereof was conducted in the same manner as in Example A1. The result of the evaluation is shown in Table 1.

Example A4

The same operations as those in Example A1 were carried out, except that the monomers to be used were changed to 94.5 parts by weight of methyl methacrylate and 5.5 parts by weight of methyl acrylate. As a result, expandable methyl methacrylate resin particles, pre-expanded particles, and an expansion-molded body were obtained. Then, evaluation thereof was conducted in the same manner as in Example A1. The result of the evaluation is shown in Table 1.

Example A5

The same operations as those in Example A1 were carried out, except that the amount of the tricalcium phosphate to be used at the initial stage of polymerization was changed to 0.165 parts by weight. As a result, expandable methyl methacrylate resin particles, pre-expanded particles, and an expansion-molded body were obtained. Then, evaluation thereof was conducted in the same manner as in Example A1. The result of the evaluation is shown in Table 1.

Example A6

The same operations as those in Example A1 were carried out, except that the amount of the tricalcium phosphate to be used at the initial stage of polymerization was changed to 0.13 parts by weight. As a result, expandable methyl methacrylate resin particles, pre-expanded particles, and an expansion-molded body were obtained. Then, evaluation thereof was conducted in the same manner as in Example A1. The result of the evaluation is shown in Table 1.

Example A7

The same operations as those in Example A 1 were carried out, except that the timing to add the tricalcium phosphate into the aqueous suspension during polymerization was changed to a timing when 85 minutes had elapsed (a polymerization conversion rate of 36%) after polymerization was initiated by heating the aqueous suspension to a temperature of 80° C. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Example A8

The same operations as those in Example A 1 were carried out, except that the timing to add the tricalcium phosphate into the aqueous suspension during polymerization was changed to a timing when 125 minutes had elapsed (a polymerization conversion rate of 53%) after polymerization was initiated by heating the aqueous suspension to a temperature of 80° C. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Comparative Example A1

The same operations as those in Example A 1 were carried out, except that the monomers to be used were changed to 100 parts by weight of methyl methacrylate and 0 part by weight of butyl acrylate. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Comparative Example A2

The same operations as those in Example A 1 were carried out, except that the monomers to be used were changed to 85 parts by weight of methyl methacrylate and 15 parts by weight of butyl acrylate. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Comparative Example A3

The same operations as those in Example A 1 were carried out, except that the amount of the tricalcium phosphate to be used at the initial stage of polymerization was changed to 0.22 parts by weight. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Comparative Example A4

The same operations as those in Example A 1 were carried out, except that the amount of the tricalcium phosphate to be used at the initial stage of polymerization was changed to 0.07 parts by weight. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Comparative Example A5

The same operations as those in Example A 1 were carried out, except that the timing to add the tricalcium phosphate into the aqueous suspension during polymerization was changed to a timing when 30 minutes had elapsed (a polymerization conversion rate of 10%) after polymerization was initiated by heating the aqueous suspension to a temperature of 80° C. As a result, expandable methyl methacrylate resin particles, pre-expanded particles, and an expansion-molded body were obtained. Then, evaluation thereof was conducted in the same manner as in Example A 1. The result of the evaluation is shown in Table 1.

Comparative Example A6

The same operations as those in Example A 1 were carried out, except that the tricalcium phosphate was not added to the aqueous suspension during polymerization. As a result, expandable methyl methacrylate resin particles, pre-expanded particles, and an expansion-molded body were obtained. Then, evaluation thereof was conducted in the same manner as in Example A 1. The result of the evaluation is shown in Table 1.

TABLE 1

| | Ex.[1] A1 | Ex.[1] A2 | Ex.[1] A3 | Ex.[1] A4 | Ex.[1] A5 | Ex.[1] A6 | Ex.[1] A7 | Ex.[1] A8 | C. Ex.[2] A1 | C. Ex.[2] A2 | C. Ex.[2] A3 | C. Ex.[2] A4 | C. Ex.[2] A5 | C. Ex.[2] A6 |
|---|---|---|---|---|---|---|---|---|---|---|---|---|---|---|
| MMA*[3] (Part) | 95 | 97 | 93 | 94.5 | 95 | 95 | 95 | 95 | 100 | 85 | 95 | 95 | 95 | 95 |
| BA*[4] (part) | 5 | 3 | 7 | — | 5 | 5 | 5 | 5 | — | 15 | 5 | 5 | 5 | 5 |
| MA*[5] (part) | — | — | — | 5.5 | — | — | — | — | — | — | — | — | — | — |
| Initial TCP* (Part) | 0.15 | 0.15 | 0.15 | 0.15 | 0.165 | 0.13 | 0.15 | 0.15 | 0.15 | 0.15 | 0.22 | 0.07 | 0.15 | 0.15 |
| Additional TCP* (part) | 0.12 | 0.12 | 0.12 | 0.12 | 0.12 | 0.12 | 0.12 | 0.12 | 0.12 | 0.12 | 0.12 | 0.12 | 0.12 | 0 |
| PCR*[6] (%) at addition of TCP* | 43 | 44 | 42 | 44 | 43 | 43 | 36 | 53 | 44 | 43 | 43 | 43 | 10 | — |

TABLE 1-continued

| | Ex.[1] A1 | Ex.[1] A2 | Ex.[1] A3 | Ex.[1] A4 | Ex.[1] A5 | Ex.[1] A6 | Ex.[1] A7 | Ex.[1] A8 | C. Ex.[2] A1 | C. Ex.[2] A2 | C. Ex.[2] A3 | C. Ex.[2] A4 | C. Ex.[2] A5 | C. Ex.[2] A6 |
|---|---|---|---|---|---|---|---|---|---|---|---|---|---|---|
| Average particle diameter (mm) | 0.8 | 0.8 | 0.8 | 0.8 | 0.7 | 0.9 | 0.73 | 0.88 | 0.8 | 0.8 | 0.4 | 1.2 | 0.67 | 1.2 |
| Variation coefficient (%) | 17.5 | 17.5 | 17.5 | 17.5 | 17.6 | 17.6 | 18.4 | 17.2 | 17.4 | 17.5 | 17.5 | 17.6 | 23.3 | 17.8 |
| Yield | Excellent | Excellent | Excellent | Excellent | Good | Good | Good | Good | Excellent | Excellent | Poor | Poor | Poor | Poor |
| Expandability | Excellent | Good | Excellent | Excellent | Good | Excellent | Good | Excellent | Poor | Excellent | Poor | Excellent | Good | Excellent |
| Amount of blocking | Excellent | Excellent | Excellent | Excellent | Good | Excellent | Good | Excellent | Excellent | Excellent | Poor | Excellent | Poor | Excellent |
| Fusibility | Excellent | Good | Good | Good | Good | Good | Good | Good | Poor | Poor | Poor | Poor | Poor | Poor |

*"TCP" stands for "tricalcium phosphate".
*[1]"Ex." stands for "Example".
*[2]"C. Ex." stands for "Comparative Example".
*[3]"MMA" stands for "methyl methacrylate".
*[4]"BA" stands for "butyl acrylate".
*[5]"MA" stands for "methyl acrylate".
*[6]"PCR" stands for "polymerization conversion rate".

Example B

The following will show Examples and Comparative Examples. However, Embodiment 2 of the present invention is not limited to them.

(Weight Average Molecular Weight)

0.02 g of expandable methyl methacrylate resin particles were dissolved in 20 cc of tetrahydrofuran. The weight average molecular weight was measured by carrying out GPC (available from Tosoh Corporation, HLC-8020, column: TSKgel Super HZM-H, column temperature: 40° C., flow rate: 0.35 ml/minute) of a resulting solution. The weight average molecular weight was obtained as a weight average molecular weight in terms of standard polystyrene.

(Measurement of Polymerization Conversion Rate)

A sample was taken from a suspension containing methyl methacrylate resin particles in a polymerization machine, and the sample thus taken was filtered with filter paper, so that a resin component was taken. From the resin component remaining on the filter paper, a certain amount (approximately 5 g) of the resin component was taken and the weight of the resin component thus taken was measured. The weight thus measured was obtained as a weight before heating. Next, a small amount (a few drops taken with a pipette) of a polymerization inhibitor was added to the resin component, and then the resin component was heated at 150° C. for 30 minutes. Thereafter, the weight of the resin component was measured again. The weight thus measured was obtained as a weight after heating. A polymerization conversion rate was calculated according to the following formula.

Polymerization conversion rate (%)=weight after heating/weight before heating×100.

(Expandability B of Expandable Methyl Methacrylate Resin Particles)

The expandable methyl methacrylate resin particles were sieved to collect expandable methyl methacrylate resin particles having a particle diameter of 0.5 mm to 1.4 mm.

The expandable methyl methacrylate resin particles thus collected were pre-expanded with use of a pressure-type pre-expansion machine (available from Obiraki Industry Co., Ltd., "BHP") under a blowing vapor pressure of 0.12 MPa to 0.16 MPa. Next, the expandability B thereof was measured in accordance with the following criteria.

Excellent: Attained a volume magnification of 65 times in 300 seconds.

Good: Attained a volume magnification of not less than 55 times and less than 65 times in 300 seconds.

Poor: Not attained a volume magnification of 55 times in 300 seconds.

Note that the volume magnification in Example B was calculated with use of a given amount of expanded particles (pre-expanded particles) taken with a measuring cup. From the volume and the weight of the expanded particles thus taken, the volume magnification was calculated in accordance with the following formula.

Volume magnification(−times)=volume (cc) of expanded particles/weight (g) of expanded particles.

<Production of Expanded Particles>

The expandable methyl methacrylate resin particles were sieved to collect expandable methyl methacrylate resin particles having a particle diameter of 0.5 mm to 1.4 mm.

The expandable methyl methacrylate resin particles thus collected were pre-expanded with use of a pressure-type pre-expansion machine (available from Obiraki Industry Co., Ltd., "BHP") under a blowing vapor pressure of 0.12 MPa to 0.16 MPa so as to attain a volume magnification of 65 times. Thereafter, the pre-expanded particles thus obtained were left at normal temperature for one day, so that methyl methacrylate expanded particles were obtained. The methyl methacrylate pre-expanded particles thus obtained were used to produce an expansion-molded body.

<Production of Expansion-Molded Body>

The methyl methacrylate pre-expanded particles thus obtained were subjected to in-mold molding with use of a molding machine (available from DAISEN, "PEONY-205DS") under a blowing vapor pressure of 0.05 MPa, so that a block-shaped expansion-molded body having a thickness of 525 mm, a length of 2000 mm, and a width of 1000 mm was obtained.

(Rate of Fusion of Expandable Methyl Methacrylate Resin Particles)

The expansion-molded body obtained as a result of <Production of expansion-molded body> described above was left at normal temperature for three days after molding. After three days passed since molding, the expansion-molded body was broken in its thickness direction. Next, the broken surface was observed, so that a rate of fusion, which is a percentage of particles broken at a portion being not a particle-to-particle interface with respect to the total number of particles constituting the broken surface, was calculated in accordance with the following formula.

Rate of fusion(%)=the number of particles broken at portion being not particle-to-particle interface/ the number of particles constituting the broken surface×100.

Based on the rate of fusion (%) thus obtained, the rate of fusion was evaluated in accordance with the following criteria.

Excellent: The percentage of the particles broken at a portion being not the particle-to-particle interface was not less than 80%.

Good: The percentage of the particles broken at a portion being not the particle-to-particle interface was not less than 60% and less than 80%.

Poor: The percentage of the particles broken at a portion being not the particle-to-particle interface was less than 60%.

(The Number of Broken Cells Among Cells Existing in Surface of Expansion-Molded Body)

The expansion-molded body obtained as a result of <Production of expansion-molded body> described above was dried in a drying chamber at 60° C. for two days, and then was taken out of the drying chamber. Next, the expansion-molded body was cut to expose a surface (skin surface), and the surface was observed with an electron microscope (available from JEOL, JSM-6060LV) under conditions of a low-pressure vacuum mode (degree of vacuum: 30 Pa), an acceleration voltage of 8 kV, and a spot size of 80. In a field of view of 1 mm×1 mm of the microscope, the number of cells having broken films on their surfaces was counted. In this manner, the number of broken cells among the cells existing in a unit area ($mm^2$) of the surface of the expansion-molded body was obtained.

(Cell Diameter Average Chord Length of Expansion-Molded Body)

The expansion-molded body obtained as a result of <Production of expansion-molded body> described above was cut with a cutter. In a photograph on which the cut surface was imaged, a range 200 μm inside from the surface of the expansion-molded body was enlarged. In this range, the number of cells on a straight line was counted. The average chord length thereof was calculated in accordance with the following formula.

Average chord length (μm)=length (μm) of measured straight line/the number of cells.

Example B1

A 6 L-autoclave with a stirrer was charged with 150 parts by weight of water, 0.15 parts by weight of tricalcium phosphate as a poorly water-soluble inorganic salt, 0.0075 parts by weight of α-olefinsulfonic acid soda, 0.08 parts by weight of lauroyl peroxide, 0.1 parts by weight of 1,1-bis(t-butyl peroxy)cyclohexane, 0.1 parts by weight of 1,6-hexanediol diacrylate, and 0.24 parts by weight of n-dodecanethiol. Thereafter, 95 parts by weight of methyl methacrylate, 5 parts by weight of butyl acrylate, and 1 part by weight of toluene were charged into the autoclave, that is, into the aqueous medium (aqueous suspension) containing the poorly water-soluble inorganic salt, and the aqueous suspension was heated to a temperature of 80° C., so that polymerization was carried out (copolymerization step). At a timing when 1 hour and 45 minutes had elapsed since the polymerization was initiated, 0.12 parts by weight of tricalcium phosphate was further added to the aqueous suspension. The polymerization conversion rate at that time (the timing when 1 hour and 45 minutes had elapsed since the polymerization was initiated) was 43%.

At a timing when 2 hours and 35 minutes had elapsed since then, 1.5 parts by weight of cyclohexane and 9 parts of normal rich butane (normal/iso=70/30) were charged into the aqueous suspension. Thereafter, the aqueous suspension was heated to a temperature of 101° C., so that polymerization and impregnation of the blowing agent were carried out for 10 hours (copolymerization step and blowing agent impregnation step). After that, the aqueous suspension was cooled. After cooling, a resulting product was cleaned, dehydrated, and dried. Consequently, expandable methyl methacrylate resin particles were obtained.

In accordance with the methods described in <Production of expanded particles> and <Production of expansion-molded body> above, pre-expanded particles were obtained with use of the expandable methyl methacrylate resin particles, and an expansion-molded body was obtained with use of the pre-expanded particles. The expandable methyl methacrylate resin particles, the pre-expanded particles, and the expansion-molded body thus obtained were evaluated. The result of the evaluation is shown in Table 2.

Example B2

The same operations as those in Example B1 were carried out, except that the monomers to be used were changed to 95.5 parts by weight of methyl methacrylate and 4.5 parts by weight of butyl acrylate. As a result, expandable methyl methacrylate resin particles, pre-expanded particles, and an expansion-molded body were obtained. Then, evaluation thereof was conducted in the same manner as in Example B1. The result of the evaluation is shown in Table 2.

Example B3

The same operations as those in Example B1 were carried out, except that the monomers to be used were changed to 94.5 parts by weight of butyl methacrylate and 5.5 parts by weight of butyl acrylate. As a result, expandable methyl methacrylate resin particles, pre-expanded particles, and an expansion-molded body were obtained. Then, evaluation thereof was conducted in the same manner as in Example B1. The result of the evaluation is shown in Table 2.

Example B4

The same operations as those in Example B1 were carried out, except that the timing to add the tricalcium phosphate into the aqueous suspension during polymerization was changed to a timing when 1 hour and 25 minutes had elapsed (a polymerization conversion rate of 36%) after polymerization was initiated by heating the aqueous suspension to a temperature of 80° C. As a result, expandable methyl methacrylate resin particles, pre-expanded particles, and an expansion-molded body were obtained. Then, evaluation thereof was conducted in the same manner as in Example B1. The result of the evaluation is shown in Table 2.

Example B5

The same operations as those in Example B1 were carried out, except that the timing to add the tricalcium phosphate into the aqueous suspension during polymerization was changed to a timing when 2 hours and 5 minutes had elapsed (a polymerization conversion rate of 53%) after polymerization was initiated by heating the aqueous suspension to a temperature of 80° C. As a result, expandable methyl methacrylate resin particles, pre-expanded particles, and an expansion-molded body were obtained. Then, evaluation thereof was conducted in the same manner as in Example B1. The result of the evaluation is shown in Table 2.

Comparative Example B1

The same operations as those in Example B1 were carried out, except that the monomers to be used were changed to 100 parts by weight of methyl methacrylate and 0 part by weight of butyl acrylate. As a result, expandable methyl methacrylate resin particles, pre-expanded particles, and an expansion-molded body were obtained. Then, evaluation thereof was conducted in the same manner as in Example B1. The result of the evaluation is shown in Table 2.

Comparative Example B2

The same operations as those in Example B1 were carried out, except that the amount of the tricalcium phosphate to be used at the initial stage of polymerization was changed to 0.22 parts by weight. As a result, expandable methyl methacrylate resin particles, pre-expanded particles, and an expansion-molded body were obtained. Then, evaluation thereof was conducted in the same manner as in Example B1. The result of the evaluation is shown in Table 2.

Comparative Example B3

The same operations as those in Example B1 were carried out, except that the amount of the tricalcium phosphate to be used at the initial stage of polymerization was changed to 0.07 parts by weight. As a result, expandable methyl methacrylate resin particles, pre-expanded particles, and an expansion-molded body were obtained. Then, evaluation thereof was conducted in the same manner as in Example B1. The result of the evaluation is shown in Table 2.

Comparative Example B4

The same operations as those in Example B1 were carried out, except that the timing to add the tricalcium phosphate into the aqueous suspension during polymerization was changed to a timing when 30 minutes had elapsed (a polymerization conversion rate of 10%) after polymerization was initiated by heating the aqueous suspension to a temperature of 80° C. As a result, expandable methyl methacrylate resin particles, pre-expanded particles, and an expansion-molded body were obtained. Then, evaluation thereof was conducted in the same manner as in Example B1. The result of the evaluation is shown in Table 2.

Comparative Example B5

The same operations as those in Example B1 were carried out, except that the tricalcium phosphate was not added to the aqueous suspension during polymerization. As a result, expandable methyl methacrylate resin particles, pre-expanded particles, and an expansion-molded body were obtained. Then, evaluation thereof was conducted in the same manner as in Example B1. The result of the evaluation is shown in Table 2.

TABLE 2

| | Ex.[1] B1 | Ex.[1] B2 | Ex.[1] B3 | Ex.[1] B4 | Ex.[1] B5 | C. Ex.[2] B1 | C. Ex.[2] B2 | C. Ex.[2] B3 | C. Ex.[2] B4 | C. Ex.[2] B5 |
|---|---|---|---|---|---|---|---|---|---|---|
| MMA[3] (Part) | 95 | 95.5 | 94.5 | 95 | 95 | 100 | 95 | 95 | 95 | 95 |
| BA[4] (part) | 5 | 4.5 | 5.5 | 5 | 5 | — | 5 | 5 | 5 | 5 |
| Initial TCP* (part) | 0.15 | 0.15 | 0.15 | 0.15 | 0.15 | 0.15 | 0.22 | 0.07 | 0.15 | 0.15 |
| Additional TCP* (part) | 0.12 | 0.12 | 0.12 | 0.12 | 0.12 | 0.12 | 0.12 | 0.12 | 0.12 | 0 |
| PCR*[5] (%) at addition of TCP* | 43 | 44 | 42 | 36 | 53 | 44 | 43 | 43 | 10 | — |
| Weight average molecular weight (g/mol × 10$^4$) | 34 | 36 | 34 | 35 | 35 | 37 | 34 | 35 | 35 | 34 |
| Cell diameter average chord length (μm) in range 200 μm inside from surface of expansion-molded body | 47 | 44 | 51 | 40 | 52 | 33 | 35 | 49 | 34 | 24 |

TABLE 2-continued

| | Ex.[1] B1 | Ex.[1] B2 | Ex.[1] B3 | Ex.[1] B4 | Ex.[1] B5 | C. Ex.[2] B1 | C. Ex.[2] B2 | C. Ex.[2] B3 | C. Ex.[2] B4 | C. Ex.[2] B5 |
|---|---|---|---|---|---|---|---|---|---|---|
| The number (/mm$^2$) of broken cells in unit area of surface of expansion-molded body | 17 | 23 | 19 | 28 | 16 | 34 | 22 | 23 | 39 | 42 |
| Expandability | Excellent | Good | Excellent | Good | Excellent | Poor | Poor | Excellent | Excellent | Excellent |
| Fusibility | Excellent | Good | Excellent | Good | Excellent | Poor | Poor | Poor | Poor | Poor |

*"TCP" stands for "tricalcium phosphate".
*[1]"Ex." stands for "Example".
*[2]"C. Ex." stands for "Comparative Example".
*[3]"MMA" stands for "methyl methacrylate".
*[4]"BA" stands for "butyl acrylate".
*[5]"PCR" stands for "polymerization conversion rate".

One or more embodiments of the present invention can provide expandable methyl methacrylate resin particles having a narrow particle size distribution, a good yield, and excellent expandability and formability. Therefore, one or more embodiments of the present invention are suitably applicable to an evaporative pattern for use in metal casting by a full mold technique.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A method for producing expandable methyl methacrylate resin particles, comprising the steps of:
   (a) copolymerizing monomers including a methyl methacrylate monomer and an acrylic ester monomer to obtain a copolymer; and
   (b) impregnating a blowing agent in the copolymer thus obtained, wherein in the step (a),
      an amount of the methyl methacrylate monomer to be added is not less than 91 parts by weight and not more than 99 parts by weight and an amount of the acrylic ester monomer to be added is not less than 1 part by weight and not more than 9 parts by weight, relative to 100 parts by weight of a total amount of the methyl methacrylate monomer and the acrylic ester monomer to be added, and
   in the step (a),
      the monomers are added to an aqueous medium to initiate a polymerization reaction of the monomers, the aqueous medium containing a poorly water-soluble inorganic salt in an amount of not less than 0.08 parts by weight and not more than 0.20 parts by weight relative to 100 parts by weight of the monomers, and
      at a timing when a polymerization conversion rate is not less than 35% and not more than 70%, the poorly water-soluble inorganic salt is added thereto in an amount of not less than 0.08 parts by weight and not more than 0.50 parts by weight relative to 100 parts by weight of the monomers, and
   the expandable methyl methacrylate resin particles have an average particle diameter of 0.6 mm to 1.0 mm.

2. The method as set forth in claim 1 for producing the expandable methyl methacrylate resin particles, wherein the monomers further include a bifunctional monomer, and
   an amount of the bifunctional monomer to be added is not less than 0.05 parts by weight and not more than 0.15 parts by weight, relative to 100 parts by weight of the total amount of the methyl methacrylate monomer and the acrylic ester monomer to be added.

3. The method as set forth in claim 1 for producing the expandable methyl methacrylate resin particles, wherein the acrylic ester monomer is butyl acrylate.

* * * * *